United States Patent
Matsuo et al.

(10) Patent No.: US 8,817,418 B1
(45) Date of Patent: Aug. 26, 2014

(54) MAGNETIC HEAD FOR PERPENDICULAR MAGNETIC RECORDING HAVING A WRITE SHIELD

(71) Applicant: TDK Corporation, Tokyo (JP)

(72) Inventors: Atsushi Matsuo, Tokyo (JP); Masahiro Saito, Tokyo (JP); Kei Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/967,811

(22) Filed: Aug. 15, 2013

(51) Int. Cl.
*G11B 5/147* (2006.01)

(52) U.S. Cl.
USPC .................................. 360/125.02

(58) Field of Classification Search
USPC .................................. 360/125.02
See application file for complete search history.

(56) References Cited

U.S. PATENT DOCUMENTS

| | | | |
|---|---|---|---|
| 5,995,342 | A | 11/1999 | Cohen et al. |
| 6,301,077 | B1 | 10/2001 | Sasaki |
| 7,365,943 | B2 | 4/2008 | Yamakawa et al. |
| 7,633,711 | B2 | 12/2009 | Hsiao et al. |
| 7,748,104 | B2 | 7/2010 | Bonhote et al. |
| 8,203,803 | B2 | 6/2012 | Etoh et al. |
| 8,411,390 | B2 | 4/2013 | Franca-Neto et al. |
| 8,422,166 | B1 * | 4/2013 | Sasaki et al. ............. 360/123.06 |
| 8,470,186 | B2 * | 6/2013 | Chen et al. ...................... 216/22 |
| 8,472,139 | B2 | 6/2013 | Urakami et al. |
| 8,514,518 | B2 | 8/2013 | McFadyen et al. |
| 8,582,234 | B2 * | 11/2013 | Linville et al. ........... 360/125.02 |
| 8,634,162 | B2 * | 1/2014 | Bonhote et al. .......... 360/125.02 |
| 2005/0111138 | A1 | 5/2005 | Yamakawa et al. |
| 2005/0128637 | A1 | 6/2005 | Johnston et al. |
| 2006/0132971 | A1 | 6/2006 | Clinton et al. |
| 2007/0035885 | A1 | 2/2007 | Im et al. |
| 2007/0188915 | A1 | 8/2007 | Aoki |
| 2009/0034121 | A1 | 2/2009 | Ohta et al. |
| 2009/0067098 | A1 | 3/2009 | Kim et al. |
| 2009/0116144 | A1 | 5/2009 | Lee et al. |
| 2011/0255196 | A1 | 10/2011 | Wu et al. |
| 2012/0147503 | A1 | 6/2012 | Zou et al. |

(Continued)

FOREIGN PATENT DOCUMENTS

| | | |
|---|---|---|
| JP | A-61-150118 | 7/1986 |
| JP | A-1-282715 | 11/1989 |

(Continued)

OTHER PUBLICATIONS

Office Action dated Mar. 20, 2014 issued in U.S. Appl. No. 13/708,507.

(Continued)

*Primary Examiner* — Mark Blouin
(74) *Attorney, Agent, or Firm* — Oliff PLC

(57) ABSTRACT

A magnetic head includes first and second coils, a main pole, a write shield, a return path section, and a core part. The write shield includes first and second shield portions located on opposite sides of the main pole in a track width direction. The return path section includes first and second yoke portions located on opposite sides of the main pole in the track width direction. The core part is magnetically connected to a part of the main pole located away from a medium facing surface. The first coil surrounds at least part of the entire outer periphery of the main pole. The second coil surrounds at least part of the core part.

19 Claims, 15 Drawing Sheets

(56) References Cited

U.S. PATENT DOCUMENTS

| | | |
|---|---|---|
| 2012/0218663 A1 | 8/2012 | Sasaki et al. |
| 2012/0314323 A1 | 12/2012 | Sasaki et al. |
| 2013/0057987 A1 | 3/2013 | Sasaki et al. |

FOREIGN PATENT DOCUMENTS

| | | |
|---|---|---|
| JP | A-2-235211 | 9/1990 |
| JP | A-5-101337 | 4/1993 |
| JP | A-9-147319 | 6/1997 |
| JP | A-2004-362668 | 12/2004 |

OTHER PUBLICATIONS

U.S. Appl. No. 13/708,507, filed Dec. 7, 2012.

U.S. Appl. No. 13/777,387, filed Feb. 26, 2013.

Office Action dated Oct. 17, 2013 issued in U.S. Appl. No. 13/708,507.

Notice of Allowance dated Sep. 3, 2013 issued in U.S. Appl. No. 13/777,387.

* cited by examiner

MAGNETIC HEAD FOR PERPENDICULAR MAGNETIC RECORDING HAVING A WRITE SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a write shield.

2. Description of Related Art

The recording systems of magnetic recording devices such as magnetic disk drives include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked. The write head unit includes a main pole that produces a write magnetic field in a direction perpendicular to the plane of a recording medium.

In a magnetic disk drive, the magnetic head is mounted on a slider that flies slightly above the surface of a recording medium. The magnetic head has a medium facing surface to face the surface of the recording medium. The recording medium includes a magnetic recording layer. Tracks are concentrically formed in the magnetic recording layer. The tracks are the area of the magnetic recording layer on which data is to be written.

Here, the side of the positions closer to a leading end relative to a reference position will be defined as the leading side, and the side of the positions closer to a trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording density, it is necessary to prevent unwanted erasure.

In order to prevent unwanted erasure induced by the skew and achieve higher recording density, it is effective to provide a write shield in the vicinity of the main pole. For example, U.S. Patent Application Publication No. 2005/0128637 A1 discloses a magnetic head having a write shield (a first side shorting shield, a second side shorting shield, a top shorting shield, and a bottom shorting shield) that has an end face wrapping around an end face of the main pole in the medium facing surface.

U.S. Pat. No. 7,365,943 B2 discloses a magnetic head having a write shield (a shield yoke) that has end faces located in the medium facing surface at positions on opposite sides of the end face of the main pole in the track width direction.

The write shield has the function of capturing a magnetic flux that is produced from the end face of the main pole and spreads in directions other than the direction perpendicular to the plane of the recording medium, so as to prevent the magnetic flux from reaching the recording medium. A magnetic head having the write shield is capable of preventing unwanted erasure and capable of providing further improved recording density.

To make full use of the function of the write shield, it is preferred to provide a return path section for connecting the write shield and a part of the main pole located away from the medium facing surface to each other. The write shield and the return path section allow a magnetic flux that has been produced from the end face of the main pole and has magnetized the recording medium to flow back to the main pole. In the magnetic head disclosed in U.S. Patent Application Publication No. 2005/0128637 A1, a first return pole located on the trailing side relative to the main pole and a second return pole located on the leading side relative to the main pole constitute the aforementioned return path section.

The magnetic head disclosed in U.S. Pat. No. 7,365,943 B2 is provided with a return yoke connected to a part of the main pole located away from the medium facing surface. However, the write shield (the shield yoke) is not connected to the return yoke. In this magnetic head, the write shield is prone to flux saturation and thus it is difficult to make full use of the function of the write shield.

In a magnetic head having the write shield and the return path section, there is a space defined by the main pole, the write shield and the return path section. A coil is provided to pass through the space. The coil is driven by a write signal.

To prevent unwanted erasure, it is particularly important to capture a sufficient amount of magnetic flux into the write shield from two portions of the end face of the write shield that are located on opposite sides of the end face of the main pole in the track width direction, and to keep the magnetic flux having been captured into the write shield from leaking out of the write shield.

In the magnetic head disclosed in U.S. Patent Application Publication No. 2005/0128637 A1, a magnetic flux having been captured into the write shield from each of the two portions of the end face of the write shield that are located on opposite sides of the end face of the main pole in the track width direction bifurcates into two separate flows: one toward the first return pole located on the trailing side relative to the main pole; and the other toward the second return pole located on the leading side relative to the main pole. At this time, the magnetic flux passes through a magnetic path composed of a plurality of magnetic layers stacked one on another. The magnetic path includes one or more boundaries between two adjacent magnetic layers, the one or more boundaries being exposed in the medium facing surface. In the vicinity of the one or more boundaries, magnetic flux tends to leak from within the magnetic path to the outside thereof. This may result in the occurrence of unwanted erasure.

With increases in frequency of write signals for higher recording densities, it is required of the write head unit to provide an improved rate of change in the direction of the magnetic flux produced from the end face of the main pole. To satisfy this requirement in the magnetic head having the write shield and the return path section, it is effective to reduce the return path section in length. To that end, it is effective to reduce the number of turns of the coil. Reducing the number of turns of the coil, however, results in a smaller magnetomotive force of the coil and thus gives rise to the problem that the minimum value of the write current required to obtain desired write characteristics, which will hereinafter be referred to as the minimum write current value, is increased.

OBJECT AND SUMMARY OF THE INVENTION

It is an object of the present invention to provide a magnetic head for perpendicular magnetic recording that is capable of preventing unwanted erasure and allows for obtaining a sufficient magnetomotive force of the coil while reducing the length of the return path section, and to provide a head assembly and a magnetic recording device that each include such a magnetic head.

A magnetic head for perpendicular magnetic recording of the present invention includes: a medium facing surface facing a recording medium; a first coil and a second coil producing magnetic fields corresponding to data to be written on the recording medium; a main pole; a write shield made of a magnetic material; a gap part made of a nonmagnetic material; a return path section made of a magnetic material; and a core part made of a magnetic material. The main pole has an end face located in the medium facing surface. The main pole allows magnetic fluxes corresponding to the magnetic fields produced by the first and second coils to pass, and produces a write magnetic field for writing data on the recording medium by means of a perpendicular magnetic recording system. The write shield has an end face located in the medium facing surface. The gap part is interposed between the main pole and the write shield. The return path section connects the write shield and a part of the main pole located away from the medium facing surface to each other. The core part is magnetically connected to the part of the main pole located away from the medium facing surface.

The end face of the write shield includes a first end face portion and a second end face portion located on opposite sides of the end face of the main pole in the track width direction. The write shield includes a first shield portion and a second shield portion located on opposite sides of the main pole in the track width direction. The first shield portion has the first end face portion. The second shield portion has the second end face portion. The return path section includes a first yoke portion and a second yoke portion located on opposite sides of the main pole in the track width direction. The first yoke portion is connected to the first shield portion so that a first space is defined by the main pole, the gap part, the first shield portion and the first yoke portion. The second yoke portion is connected to the second shield portion so that a second space is defined by the main pole, the gap part, the second shield portion and the second yoke portion. The first coil passes through the first and second spaces so as to surround at least part of the entire outer periphery of the main pole when viewed from the medium facing surface. The first shield portion includes a portion located between the first space and the medium facing surface. The second shield portion includes a portion located between the second space and the medium facing surface. The second coil passes through neither of the first and second spaces and surrounds at least part of the core part.

In the magnetic head of the present invention, the end face of the write shield may further include a third end face portion located on the front side in the direction of travel of the recording medium relative to the end face of the main pole, and the write shield may further include a third shield portion located on the front side in the direction of travel of the recording medium relative to the main pole. The third shield portion has the third end face portion.

Where the write shield includes the third shield portion, the return path section may further include a third yoke portion located on the front side in the direction of travel of the recording medium relative to the main pole. The third yoke portion is connected to the third shield portion so that a third space is defined by the main pole, the gap part, the third shield portion and the third yoke portion. The first coil may include a portion passing through the third space.

In the magnetic head of the present invention, the end face of the write shield may further include a fourth end face portion located on the rear side in the direction of travel of the recording medium relative to the end face of the main pole, and the write shield may further include a fourth shield portion located on the rear side in the direction of travel of the recording medium relative to the main pole. The fourth shield portion has the fourth end face portion.

Where the write shield includes the fourth shield portion, the return path section may further include a fourth yoke portion located on the rear side in the direction of travel of the recording medium relative to the main pole. The fourth yoke portion is connected to the fourth shield portion so that a fourth space is defined by the main pole, the gap part, the fourth shield portion and the fourth yoke portion. The first coil may include a portion passing through the fourth space.

In the magnetic head of the present invention, the end face of the write shield may further include a third end face portion located on the front side in the direction of travel of the recording medium relative to the end face of the main pole, and a fourth end face portion located on the rear side in the direction of travel of the recording medium relative to the end face of the main pole. Furthermore, the write shield may further include a third shield portion located on the front side in the direction of travel of the recording medium relative to the main pole, and a fourth shield portion located on the rear side in the direction of travel of the recording medium relative to the main pole. The third shield portion has the third end face portion, and the fourth shield portion has the fourth end face portion.

Where the write shield includes the third and fourth shield portions, the return path section may further include a third yoke portion located on the front side in the direction of travel of the recording medium relative to the main pole, and a fourth yoke portion located on the rear side in the direction of travel of the recording medium relative to the main pole. The third yoke portion is connected to the third shield portion so that a third space is defined by the main pole, the gap part, the third shield portion and the third yoke portion. The fourth yoke portion is connected to the fourth shield portion so that a fourth space is defined by the main pole, the gap part, the fourth shield portion and the fourth yoke portion. The first coil may include a portion passing through at least one of the third space and the fourth space.

In the magnetic head of the present invention, the second coil may be located on the front side in the direction of travel of the recording medium relative to the main pole. In such a case, the end face of the write shield may further include a third end face portion located on the front side in the direction of travel of the recording medium relative to the end face of the main pole, and the write shield may further include a third shield portion located on the front side in the direction of travel of the recording medium relative to the main pole. The third shield portion has the third end face portion. The return path section may further include a third yoke portion located on the front side in the direction of travel of the recording medium relative to the main pole. In such a case, the third yoke portion may couple the third shield portion and the core part to each other so that a third space is defined by the main pole, the gap part, the third shield portion, the third yoke portion and the core part.

In the magnetic head of the present invention, the second coil may be located on the rear side in the direction of travel of the recording medium relative to the main pole. In such a case, the end face of the write shield may further include a fourth end face portion located on the rear side in the direction of travel of the recording medium relative to the end face of the main pole, and the write shield may further include a fourth shield portion located on the rear side in the direction of travel of the recording medium relative to the main pole. The fourth shield portion has the fourth end face portion. The return path section may further include a fourth yoke portion located on the rear side in the direction of travel of the recording medium relative to the main pole. In such a case, the fourth yoke portion may couple the fourth shield portion and the core part to each other so that a fourth space is defined by the main pole, the gap part, the fourth shield portion, the fourth yoke portion and the core part.

In the magnetic head of the present invention, the end face of the write shield may further include a third end face portion located on the front side in the direction of travel of the recording medium relative to the end face of the main pole, and a fourth end face portion located on the rear side in the direction of travel of the recording medium relative to the end face of the main pole. Furthermore, the write shield may further include a third shield portion located on the front side in the direction of travel of the recording medium relative to the main pole, and a fourth shield portion located on the rear side in the direction of travel of the recording medium relative to the main pole. The third shield portion has the third end face portion, and the fourth shield portion has the fourth end face portion. The return path section may further include a third yoke portion located on the front side in the direction of travel of the recording medium relative to the main pole, and a fourth yoke portion located on the rear side in the direction of travel of the recording medium relative to the main pole. The third yoke portion is connected to the third shield portion so that a third space is defined by the main pole, the gap part, the third shield portion and the third yoke portion. The fourth yoke portion couples the fourth shield portion and the core part to each other so that a fourth space is defined by the main pole, the gap part, the fourth shield portion, the fourth yoke portion and the core part. The first coil may include a portion passing through the third space. The second coil may include a portion passing through the fourth space.

In the magnetic head of the present invention, the first coil may not wrap one turn around the entire outer periphery of the main pole. Alternatively, the first coil may surround the entire outer periphery of the main pole when viewed from the medium facing surface.

A head assembly of the present invention includes a slider, and a supporter that flexibly supports the slider. The slider includes the magnetic head of the present invention and is disposed to face a recording medium.

A magnetic recording device of the present invention includes the magnetic head of the present invention, a recording medium, and a positioning device that supports the magnetic head and positions the magnetic head with respect to the recording medium.

In the magnetic head of the present invention, the write shield includes the first and second shield portions located on opposite sides of the main pole in the track width direction, and the return path section includes the first and second yoke portions located on opposite sides of the main pole in the track width direction. The first coil passes through the first and second spaces so as to surround at least part of the entire outer periphery of the main pole when viewed from the medium facing surface. By virtue of these features, the magnetic head of the present invention and the head assembly and the magnetic recording device including this magnetic head make it possible to prevent unwanted erasure.

Further, in the magnetic head of the present invention, the second coil passes through neither of the first and second spaces and surrounds at least part of the core part. By virtue of these features, the magnetic head of the present invention and the head assembly and the magnetic recording device including this magnetic head make it possible to obtain a sufficient magnetomotive force from the first and second coils while reducing the length of the return path section.

Other objects, features and advantages of the present invention will become fully apparent from the following description.

DETAILED DESCRIPTION OF THE PREFERRED EMBODIMENTS

First Embodiment

Figure 9:
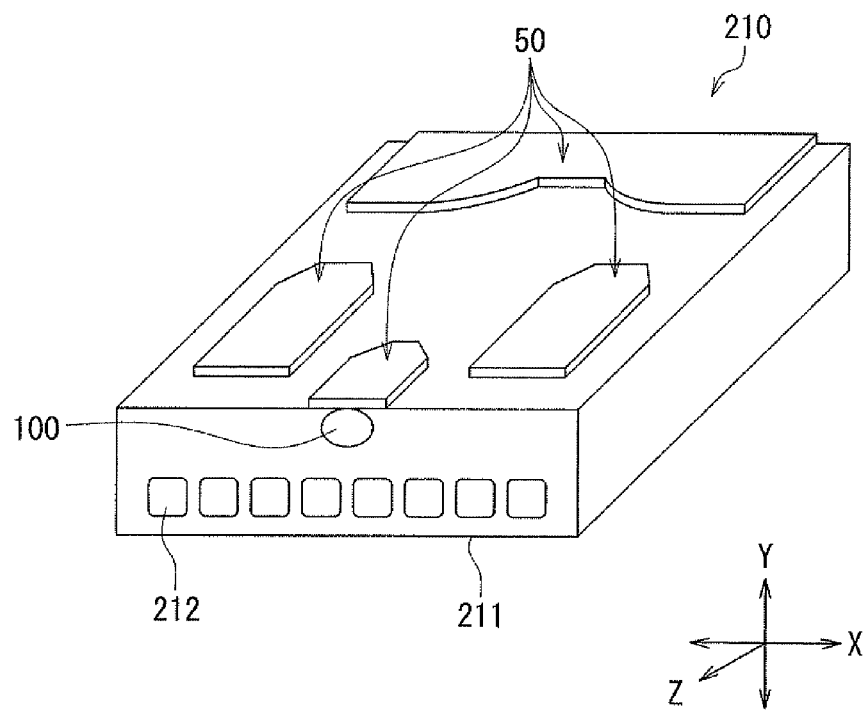
FIG. 9 is a perspective view showing a slider including the magnetic head according to the first embodiment of the invention.

Embodiments of the present invention will now be described in detail with reference to the drawings. First, reference is made to FIG. 9 to describe a slider 210 including a magnetic head according to a first embodiment of the invention. The magnetic head according to the present embodiment is for use in perpendicular magnetic recording. In a magnetic recording device, the slider 210 is disposed to face a circular-plate-shaped recording medium (a magnetic disk) that is driven to rotate. In FIG. 9, the X direction is a direction across the tracks of the recording medium, i.e., the track width direction. The Y direction is a direction perpendicular to the surface of the recording medium. The Z direction is the direction of travel of the recording medium when viewed from the slider 210. The X, Y, and Z directions are orthogonal to one another. The slider 210 has a base body 211. The base body 211 is generally hexahedron-shaped. One of the six surfaces of the base body 211 is designed to face the surface of the recording medium. At this one of the six surfaces, there is formed a medium facing surface 50 to face the surface of the recording medium. When the recording medium rotates and travels in the Z direction, an airflow passing between the recording medium and the slider 210 causes a lift below the slider 210 in the Y direction of FIG. 9. The lift causes the slider 210 to fly over the surface of the recording medium. The magnetic head 100 according to the present embodiment is formed near the air-outflow-side end (the end in the Z direction) of the slider 210. A plurality of terminals 212 are also provided at the air-outflow-side end of the slider 210.

A head assembly according to the present embodiment will now be described with reference to FIG. 10. The head assembly according to the present embodiment includes the slider 210 shown in FIG. 9 and a supporter that flexibly supports the slider 210. Forms of the head assembly include a head gimbal assembly and a head arm assembly described below.

The head gimbal assembly 220 will be described first. The head gimbal assembly 220 includes the slider 210, and a suspension 221 serving as the supporter that flexibly supports the slider 210. The suspension 221 includes: a plate-spring-shaped load beam 222 formed of, e.g., stainless steel; a flexure 223 to which the slider 210 is joined, the flexure 223 being provided at an end of the load beam 222 and giving an appropriate degree of freedom to the slider 210; and a base plate 224 provided at the other end of the load beam 222. The base plate 224 is configured to be attached to an arm 230 of an actuator for moving the slider 210 along the X direction across the tracks of the recording medium 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms with a plurality of head gimbal assemblies 220 respectively attached to the arms is called a head stack assembly.

Figure 10:
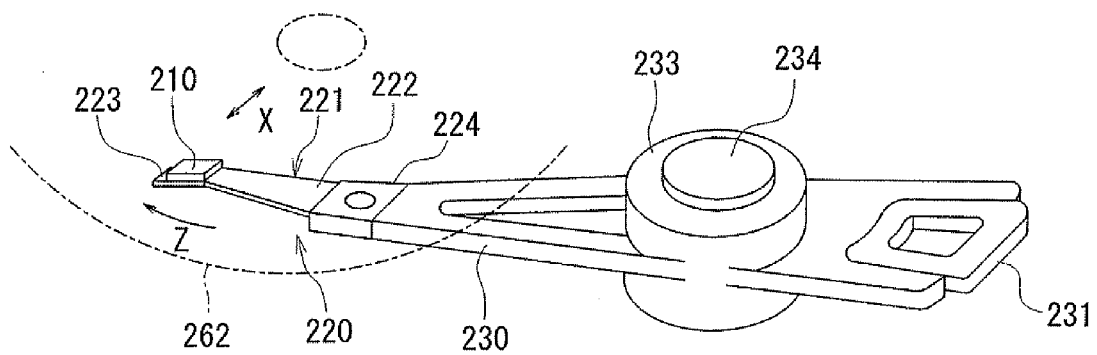
FIG. 10 is a perspective view showing a head arm assembly according to the first embodiment of the invention.

FIG. 10 shows the head arm assembly according to the present embodiment. In the head arm assembly, the head gimbal assembly 220 is attached to an end of the arm 230. A coil 231 that forms part of the voice coil motor is fixed to the other end of the arm 230. A bearing 233 is provided in the middle of the arm 230. The bearing 233 is attached to a shaft 234 for rotatably supporting the arm 230.

Figure 11:
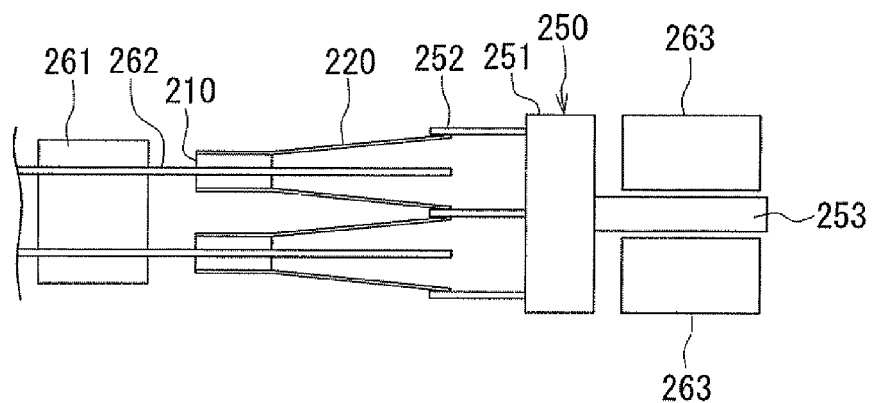
FIG. 11 is an explanatory diagram for illustrating the main part of a magnetic recording device according to the first embodiment of the invention.
Figure 12:
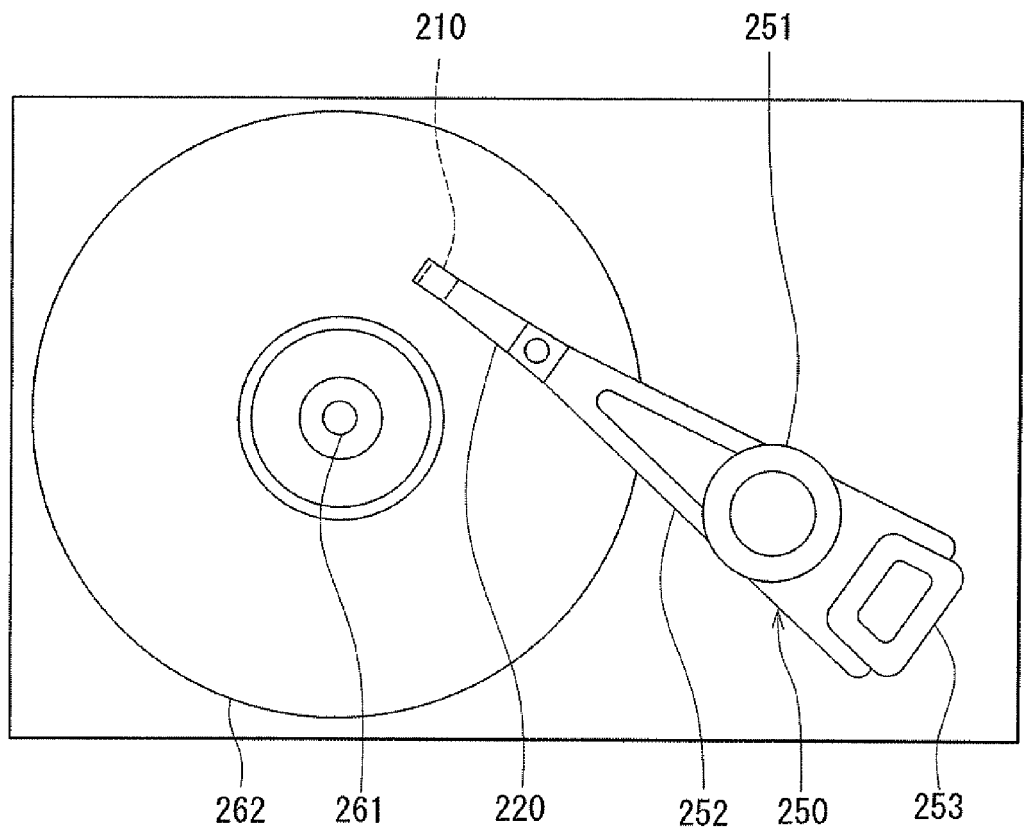
FIG. 12 is a plan view of the magnetic recording device according to the first embodiment of the invention.

Reference is now made to FIG. 11 and FIG. 12 to describe an example of the head stack assembly and an example of a magnetic recording device according to the present embodiment. FIG. 11 is an explanatory diagram illustrating the main part of the magnetic recording device. FIG. 12 is a plan view of the magnetic recording device. The head stack assembly 250 includes a carriage 251 having a plurality of arms 252. A plurality of head gimbal assemblies 220 are attached to the arms 252 such that the assemblies 220 are aligned in the vertical direction with spacing between every adjacent ones. A coil 253 forming part of the voice coil motor is mounted on a side of the carriage 251 opposite from the arms 252. The head stack assembly 250 is installed in the magnetic recording device. The magnetic recording device includes a plurality of recording media 262 mounted on a spindle motor 261. Two sliders 210 are allocated to each recording medium 262 such that the two sliders 210 are opposed to each other with the recording medium 262 interposed therebetween. The voice coil motor includes permanent magnets 263 arranged to be opposed to each other with the coil 253 of the head stack assembly 250 interposed therebetween. The actuator and the head stack assembly 250 except the sliders 210 support the sliders 210 and position them with respect to the recording media 262. Note that the magnetic recording device of the present invention may be configured otherwise than the above-described configuration. For example, the magnetic recording device of the present invention may be provided with a single recording medium 262 and one or two head gimbal assemblies 220.

In the magnetic recording device according to the present embodiment, the actuator moves the slider 210 across the tracks of the recording medium 262 and positions the slider 210 with respect to the recording medium 262. The magnetic head 100 included in the slider 210 has a read head unit and a write head unit, which will be described in detail later.

Figure 1:
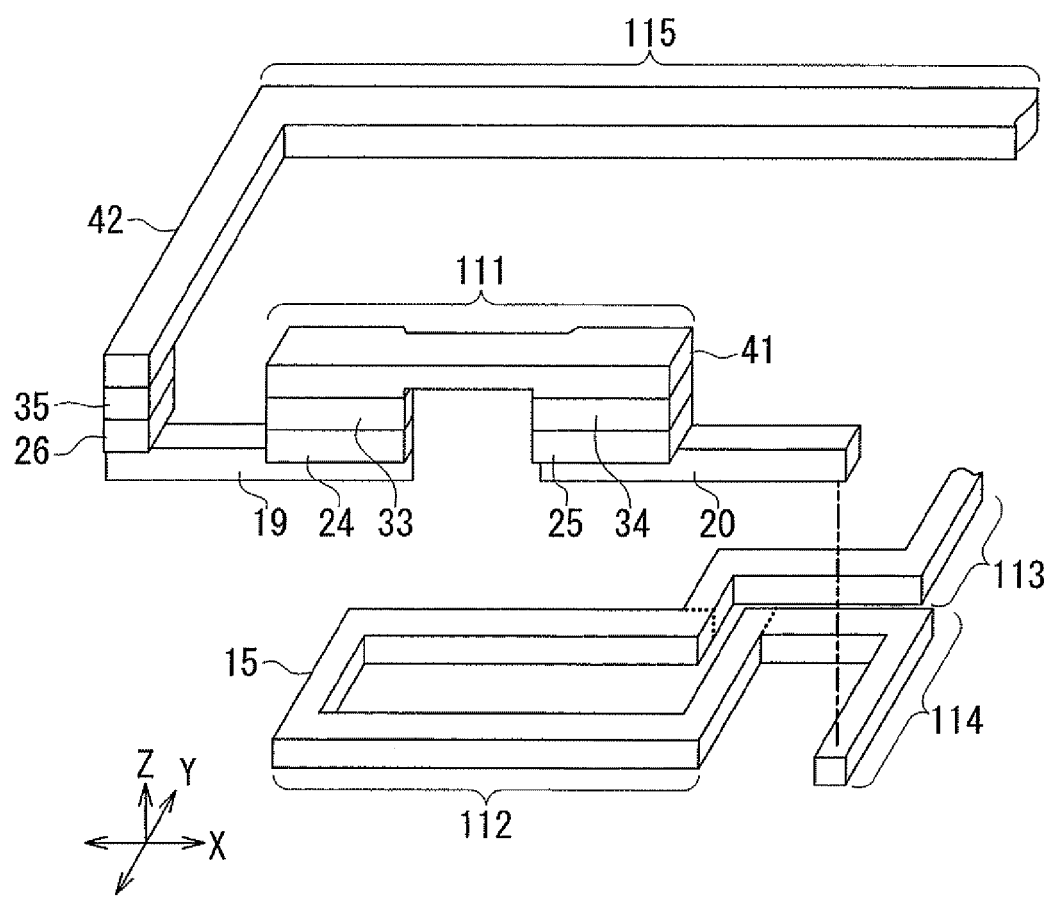
FIG. 1 is a perspective view showing first and second coils of a magnetic head according to a first embodiment of the invention.
Figure 2:
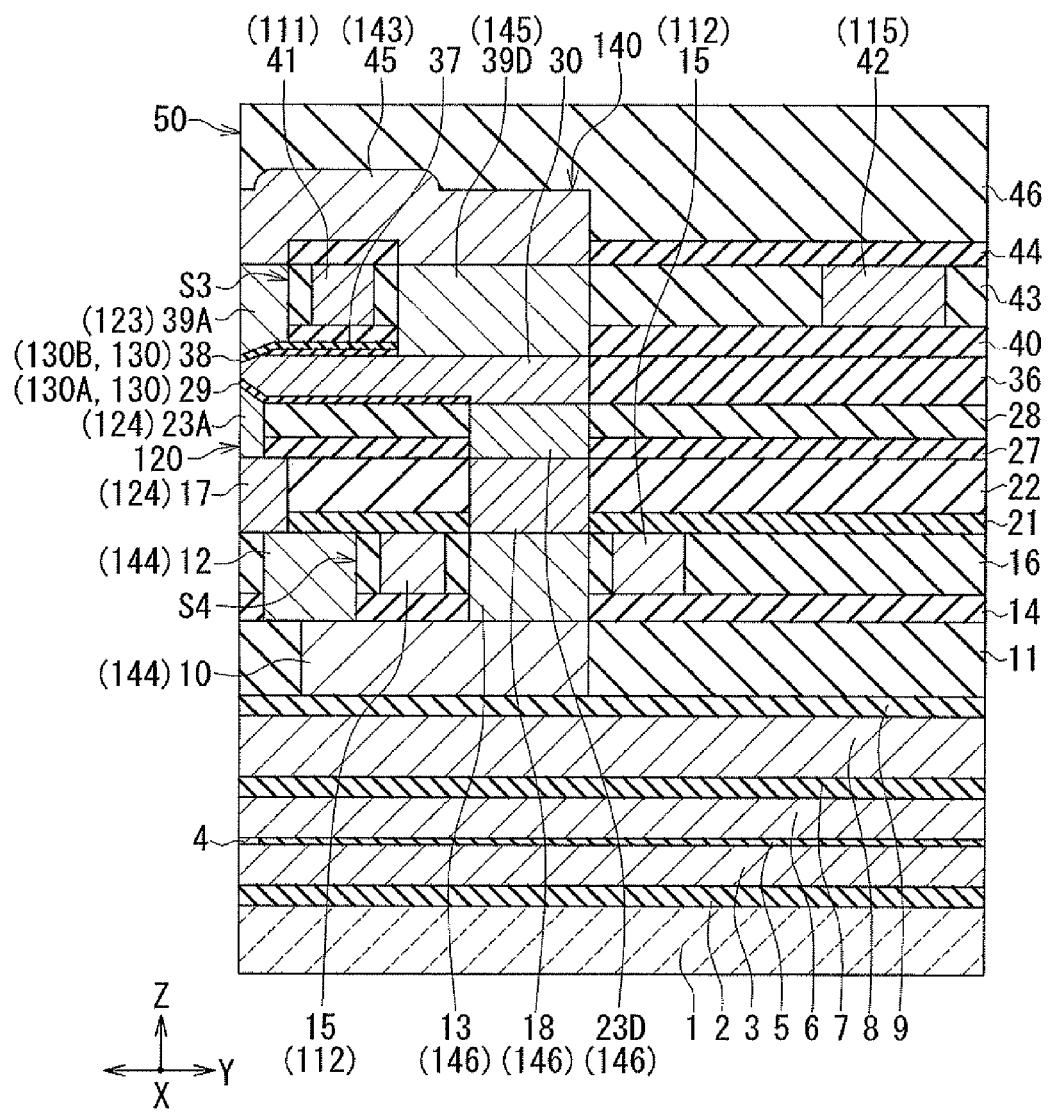
FIG. 2 is a cross-sectional view showing the configuration of the magnetic head according to the first embodiment of the invention.
Figure 3:
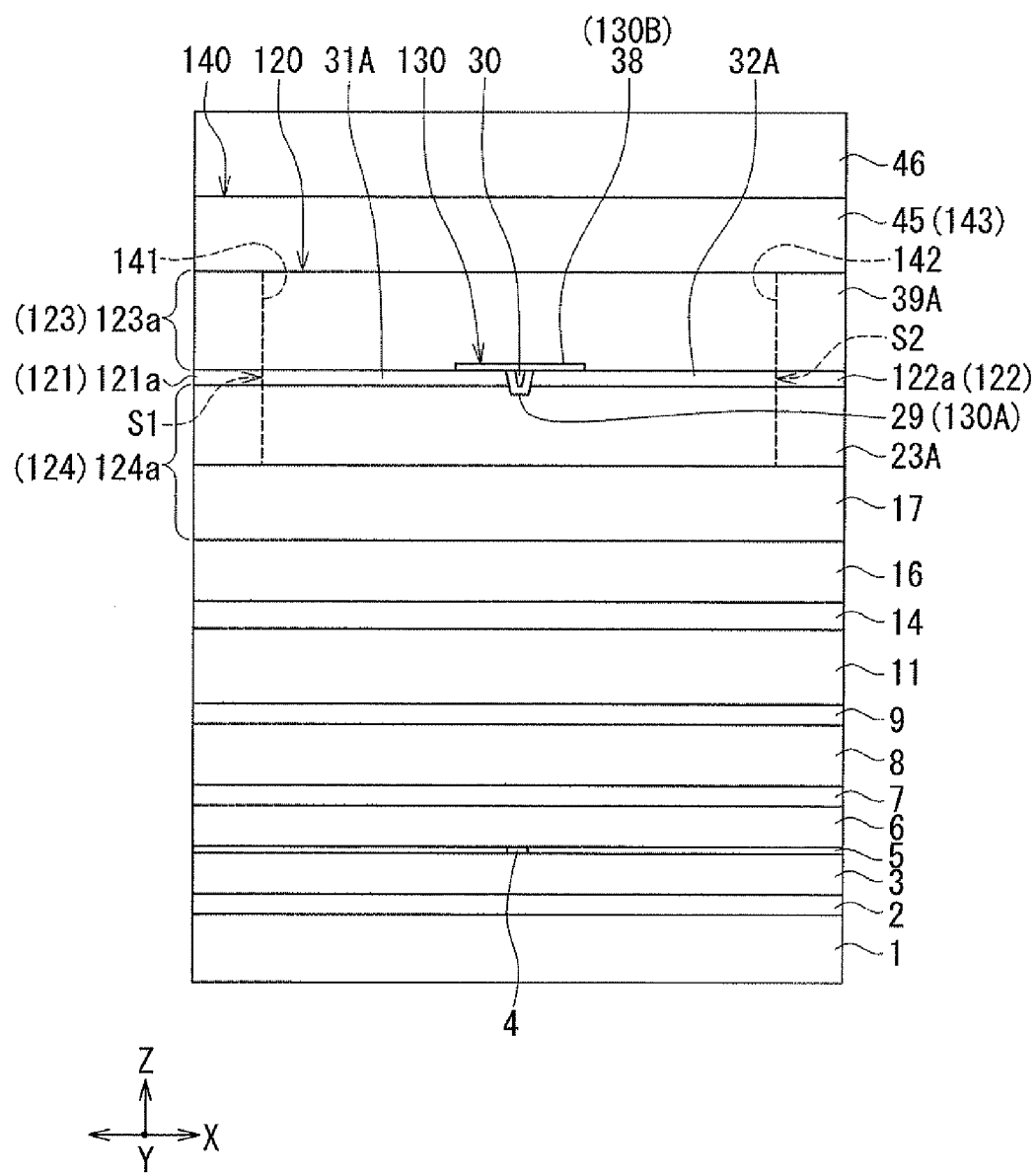
FIG. 3 is a front view showing the medium facing surface of the magnetic head according to the first embodiment of the invention.

Reference is now made to FIG. 1 to FIG. 3 to describe the general configuration of the magnetic head according to the present embodiment, particularly the general configuration of the write head unit. FIG. 1 is a perspective view showing first and second coils of the magnetic head. FIG. 2 is a cross-sectional view showing the configuration of the magnetic head. FIG. 3 is a front view showing the medium facing surface of the magnetic head. The X, Y, and Z directions shown in FIG. 9 are also shown in FIG. 1 to FIG. 3.

As shown in FIG. 2, the magnetic head according to the present embodiment has the medium facing surface 50. The write head unit includes a first coil 111, a second coil 112, leads 113, 114 and 115, a main pole 30, a write shield 120, a gap part 130, and a return path section 140. The main pole 30, the write shield 120 and the return path section 140 are each made of a magnetic material. The magnetic material may be, for example, NiFe, CoFe, CoNiFe, CoNi, FeCo, or FeNi.

The main pole 30 has an end face located in the medium facing surface 50, a top surface, a bottom end opposite to the top surface, and two side surfaces connecting the top surface and the bottom end to each other. In the present embodiment, in particular, the thickness of the main pole 30 in the vicinity of the medium facing surface 50 decreases toward the medium facing surface 50. The top surface of the main pole 30 includes a first inclined portion and a first flat portion arranged in this order, the first inclined portion being closer to the medium facing surface 50. The bottom end of the main pole 30 includes a second inclined portion and a second flat portion arranged in this order, the second inclined portion being closer to the medium facing surface 50. The first inclined portion has a first end located in the medium facing surface 50 and a second end opposite to the first end. The first flat portion is connected to the second end. The first inclined portion is inclined such that the second end is located on the front side in the direction of travel of the recording medium (the Z direction), i.e., the trailing side, relative to the first end.

The second inclined portion has a third end located in the medium facing surface 50 and a fourth end opposite to the third end. The second flat portion is connected to the fourth end. The second inclined portion is inclined such that the fourth end is located on the rear side in the direction of travel of the recording medium, i.e., the leading side, relative to the third end.

The width of the end face of the main pole 30 located in the medium facing surface 50 decreases toward the leading-side end, for example. The position of the end of a record bit to be recorded on a recording medium depends on the position of the trailing-side edge of the end face of the main pole 30. FIG. 3 illustrates an example in which the end face of the main pole 30 has a trapezoidal shape. However, the shape of the end face of the main pole 30 is not limited thereto, and may be, for example, square, rectangular, circular or elliptical. Alternatively, the end face of the main pole 30 may be in the shape of a pentagon with one vertex located at the leading-side end and with one side located at the trailing-side end.

The main pole 30 includes: a track width defining portion having an end face located in the medium facing surface 50 and an end opposite thereto; and a wide portion connected to the end of the track width defining portion. The track width defining portion and the wide portion will be described later.

The write shield 120 has an end face located in the medium facing surface 50. As shown in FIG. 3, the end face of the write shield 120 includes first to fourth end face portions 121a, 122a, 123a, and 124a. The first and second end face portions 121a and 122a are located on opposite sides of the end face of the main pole 30 in the track width direction (the X direction). The third end face portion 123a is located on the front side in the direction of travel of the recording medium (the Z direction), i.e., the trailing side, relative to the end face of the main pole 30. The fourth end face portion 124a is located on the rear side in the direction of travel of the recording medium, i.e., the leading side, relative to the end face of the main pole 30. In the medium facing surface 50, the first to fourth end face portions 121a, 122a, 123a, and 124a are arranged to wrap around the end face of the main pole 30.

The write shield 120 includes first to fourth shield portions 121, 122, 123, and 124. The first and second shield portions 121 and 122 are located on opposite sides of the main pole 30 in the track width direction. The third shield portion 123 is located on the front side in the direction of travel of the recording medium relative to the main pole 30. The fourth shield portion 124 is located on the rear side in the direction of travel of the recording medium relative to the main pole 30.

As shown in FIG. 3, the first shield portion 121 has the first end face portion 121a. The second shield portion 122 has the second end face portion 122a. The third shield portion 123 has the third end face portion 123a. The fourth shield portion 124 has the fourth end face portion 124a.

The gap part 130 is made of a nonmagnetic material such as alumina ($Al_2O_3$) and interposed between the main pole 30 and the write shield 120. The gap part 130 includes a first gap portion 130A interposed between the main pole 30 and each of the first, second and fourth shield portions 121, 122 and 124, and a second gap portion 130B interposed between the main pole 30 and the third shield portion 123. In the medium facing surface 50, the width of the second gap portion 130B in the track width direction is greater than the distance between the first shield portion 121 and the second shield portion 122. This is for the purpose of preventing the end of a record bit to be recorded on a recording medium from becoming arc-shaped.

The return path section 140 connects the write shield 120 and a part of the main pole 30 located away from the medium facing surface 50 to each other, thereby magnetically coupling the write shield 120 and the main pole 30 to each other. The return path section 140 includes first to fourth yoke portions 141, 142, 143 and 144, and first and second coupling portions 145 and 146. As shown in FIG. 3, the first and second yoke portions 141 and 142 are located on opposite sides of the main pole 30 in the track width direction. As shown in FIG. 2 and FIG. 3, the third yoke portion 143 is located on the front side in the direction of travel of the recording medium relative to the main pole 30. As shown in FIG. 2, the fourth yoke portion 144 is located on the rear side in the direction of travel of the recording medium relative to the main pole 30.

The first yoke portion 141 is connected to the first shield portion 121 so that a first space S1 is defined by the main pole 30, the gap part 130, the first shield portion 121 and the first yoke portion 141. The second yoke portion 142 is connected to the second shield portion 122 so that a second space S2 is defined by the main pole 30, the gap part 130, the second shield portion 122 and the second yoke portion 142. The first shield portion 121 includes a portion located between the first space S1 and the medium facing surface 50. The second shield portion 122 includes a portion located between the second space S2 and the medium facing surface 50.

As shown in FIG. 2, the third yoke portion 143 is connected to the third shield portion 123 of the write shield 120 so that a third space S3 is defined by the main pole 30, the gap part 130, the third shield portion 123 and the third yoke portion 143. The fourth yoke portion 144 of the return path section 140 is connected to the fourth shield portion 124 of the write shield 120 so that a fourth space S4 is defined by the main pole 30, the gap part 130, the fourth shield portion 124 and the fourth yoke portion 144.

The first and second coupling portions 145 and 146 are located away from the medium facing surface 50. The first coupling portion 145 is located on the front side in the direction of travel of the recording medium relative to the main pole 30 and connected to the main pole 30, and couples a part of the first yoke portion 141, a part of the second yoke portion 142, and the third yoke portion 143 to each other. The second coupling portion 146 is located on the rear side in the direction of travel of the recording medium relative to the main pole 30 and connected to the main pole 30, and couples another part of the first yoke portion 141, another part of the second yoke portion 142, and the fourth yoke portion 144 to each other.

As shown in FIG. 3, when the write shield 120 includes the first to fourth shield portions 121, 122, 123 and 124, the first yoke portion 141 need only be connected to one or more of the shield portions 121, 123 and 124, while the second yoke portion 142 need only be connected to one or more of the shield portions 122, 123 and 124.

The write shield 120 may include only the first to third shield portions 121, 122 and 123. In such a case, the return path section 140 may include only the first to third yoke portions 141, 142 and 143. The first yoke portion 141 need only be connected to at least one of the shield portions 121 and 123, while the second yoke portion 142 need only be connected to at least one of the shield portions 122 and 123.

The write shield 120 may include only the first, second and fourth shield portions 121, 122 and 124. In such a case, the return path section 140 may include only the first, second and fourth yoke portions 141, 142 and 144. The first yoke portion 141 need only be connected to at least one of the shield portions 121 and 124, while the second yoke portion 142 need only be connected to at least one of the shield portions 122 and 124.

The write shield 120 may include only the first and second shield portions 121 and 122. In such a case, the return path section 140 may include only the first and second yoke portions 141 and 142. The first yoke portion 141 is connected to the shield portion 121, while the second yoke portion 142 is connected to the shield portion 122.

The main pole 30 and the return path section 140 form one or more interfaces therebetween. In the present embodiment, in particular, the main pole 30 and the return path section 140 form four interfaces therebetween. The distance from the medium facing surface 50 to one of edges of the one or more interfaces between the main pole 30 and the return path section 140, the one of the edges being closest to the medium facing surface 50, will be defined as the yoke length. In the present embodiment, the yoke length is the shortest one of the distances from the medium facing surface 50 to respective ones of edges of the interfaces between: the main pole 30 and the yoke portion 141; the main pole 30 and the yoke portion 142; the main pole 30 and the coupling portion 145; and the main pole 30 and the coupling portion 146, the respective ones of the edges being closest to the medium facing surface 50. The aforementioned distances from the medium facing surface 50 to the respective ones of the edges of the interfaces between the main pole 30 and the portions 141, 142, 145, and 146 closest to the medium facing surface 50 may be equal to each other. The yoke length falls within the range of 1.0 to 2.5 µm, for example.

The first coil 111 passes through the first and second spaces S1 and S2 so as to surround at least part of the entire outer periphery of the main pole 30 when viewed from the medium facing surface 50. In the present embodiment, the first coil 111 particularly surrounds, of the entire outer periphery of the main pole 30 when viewed from the medium facing surface 50, a portion located on the front side in the direction of travel of the recording medium (the Z direction) and portions located on opposite sides in the track width direction (the X direction). Thus, the first coil 111 does not wrap one turn around the entire outer periphery of the main pole 30.

The first coil 111 passes through the third space S3 in addition to the first and second spaces S1 and S2. In other words, the first coil 111 includes a portion passing through the third space S3. Both ends of the first coil 111 are located on the rear side in the direction of travel of the recording medium relative to the main pole 30.

The second coil 112 is located on the rear side in the direction of travel of the recording medium relative to the main pole 30, passes through neither of the first and second spaces S1 and S2 and surrounds at least part of the second coupling portion 146. In the present embodiment, in particular, the second coil 112 is located on the rear side in the direction of travel of the recording medium relative to the first coil 111, and surrounds substantially the entire outer periphery of the second coupling portion 146 when viewed from above. In the present embodiment, the second coupling portion 146 corresponds to the "core part" of the present invention. The second coupling portion (the core part) 146 is part of the return path section 140 and made of a magnetic material. The second coupling portion (the core part) 146 is magnetically connected to part of the main pole 30 located away from the medium facing surface 50.

In the present embodiment, the fourth space S4 is a space defined by the main pole 30, the gap part 130, the fourth shield portion 124, the fourth yoke portion 144 and the second coupling portion (the core part) 146, in particular. The fourth yoke portion 144 couples the fourth shield portion 124 and the second coupling portion (the core part) 146 to each other so that the fourth space S4 is formed. The second coil 112 passes through the fourth space S4. In other words, the second coil 112 includes a portion passing through the fourth space S4.

The leads 113 and 114 are both located on the rear side in the direction of travel of the recording medium relative to the main pole 30. The lead 113 is connected to one end of the second coil 112. The lead 114 is connected to the other end of the second coil 112 and one end of the first coil 111. In FIG. 1, the boundary between the second coil 112 and the lead 113 and the boundary between the second coil 112 and the lead 114 are indicated by dotted lines.

The lead 115 is located on the rear side in the direction of travel of the recording medium relative to the main pole 30 and connected to the other end of the first coil 111. The lead 115 extends from the other end of the first coil 111 to a point located on the front side in the direction of travel of the recording medium relative to the main pole 30.

The first coil 111 may include a magnetic portion made of a magnetic conductive material and a nonmagnetic portion made of a nonmagnetic conductive material. Likewise, the lead 115 may include a magnetic portion made of a magnetic conductive material and a nonmagnetic portion made of a nonmagnetic conductive material. Alternatively, each of the first coil 111 and the lead 115 may consist entirely of the nonmagnetic portion and not include the magnetic portion. Each of the second coil 112 and the leads 113 and 114 is formed entirely of a nonmagnetic conductive material. Cu is an example of a nonmagnetic conductive material that can be used for the coils 111 and 112 and the leads 113 to 115. Examples of magnetic conductive materials that can be used for the coil 111 and the lead 115 include NiFe, CoFe, CoNiFe, CoNi, FeCo, and FeNi.

Where each of the first coil 111 and the lead 115 includes the aforementioned magnetic portion, each of the write shield 120 and the return path section 140 may include a portion made of the same material as the aforementioned magnetic portion. Specific locations of the respective magnetic portions will be described in detail later.

Figure 4:
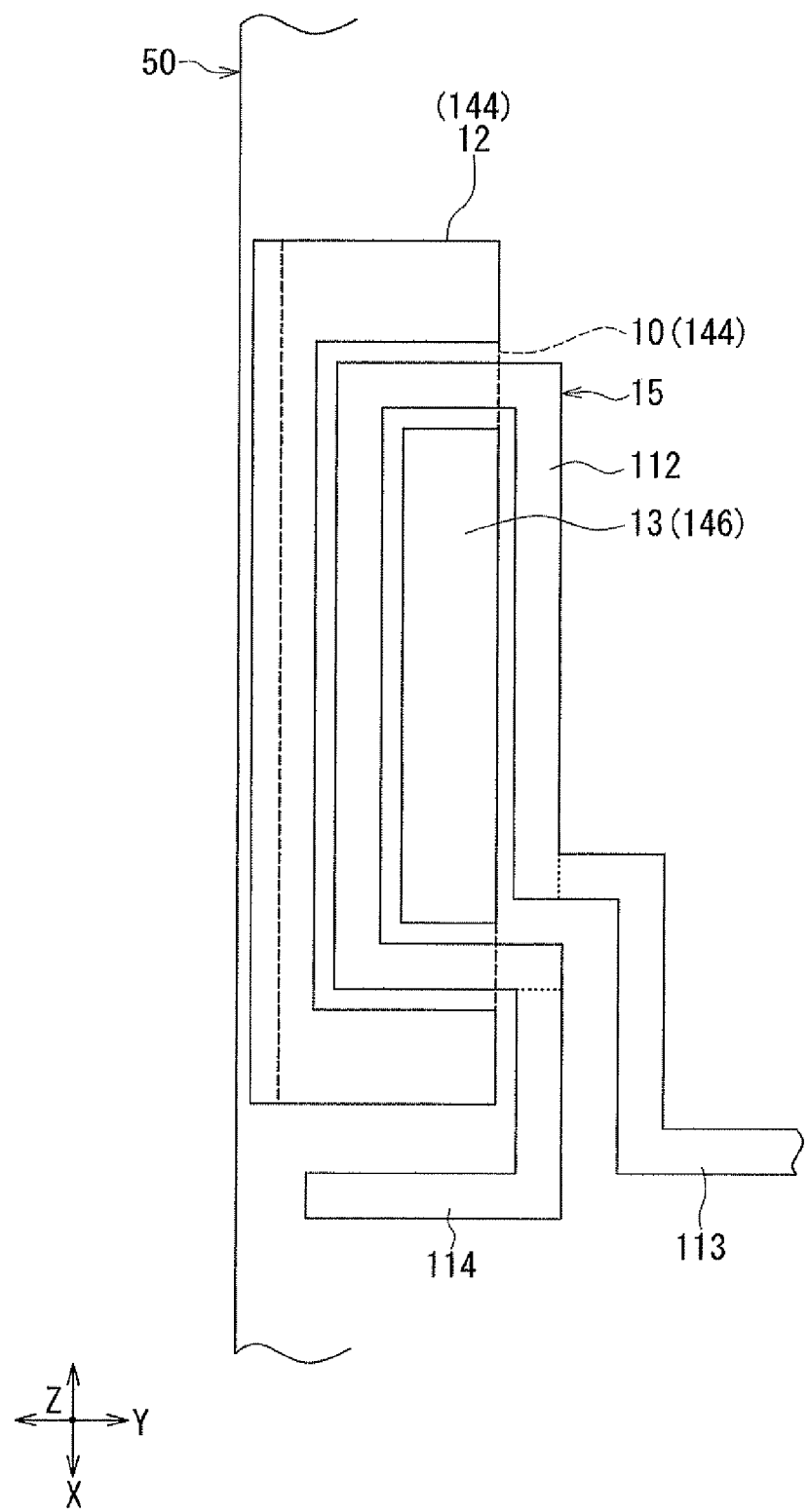
FIG. 4 is a plan view showing the second coil of the magnetic head according to the first embodiment of the invention.
Figure 5:
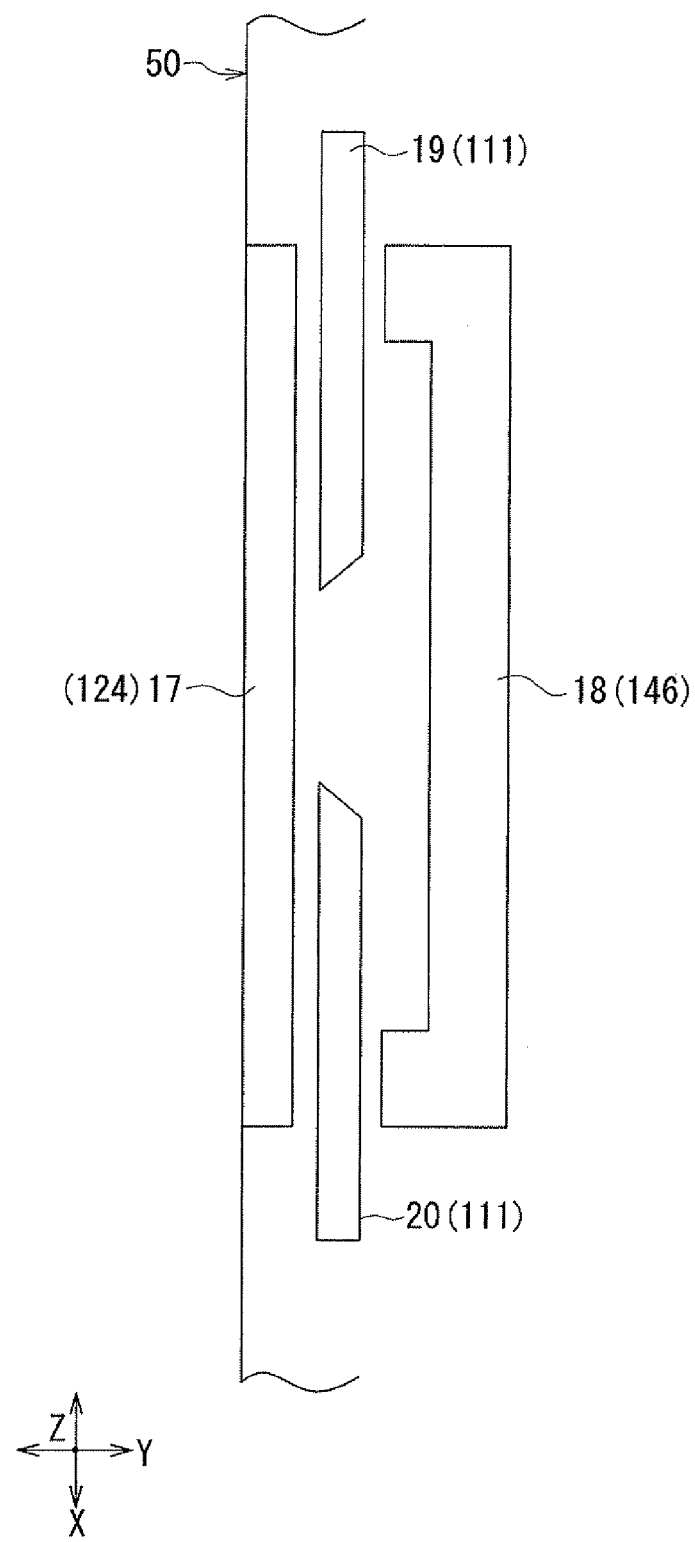
FIG. 5 is a plan view showing a portion of the first coil of the magnetic head according to the first embodiment of the invention.
Figure 6:
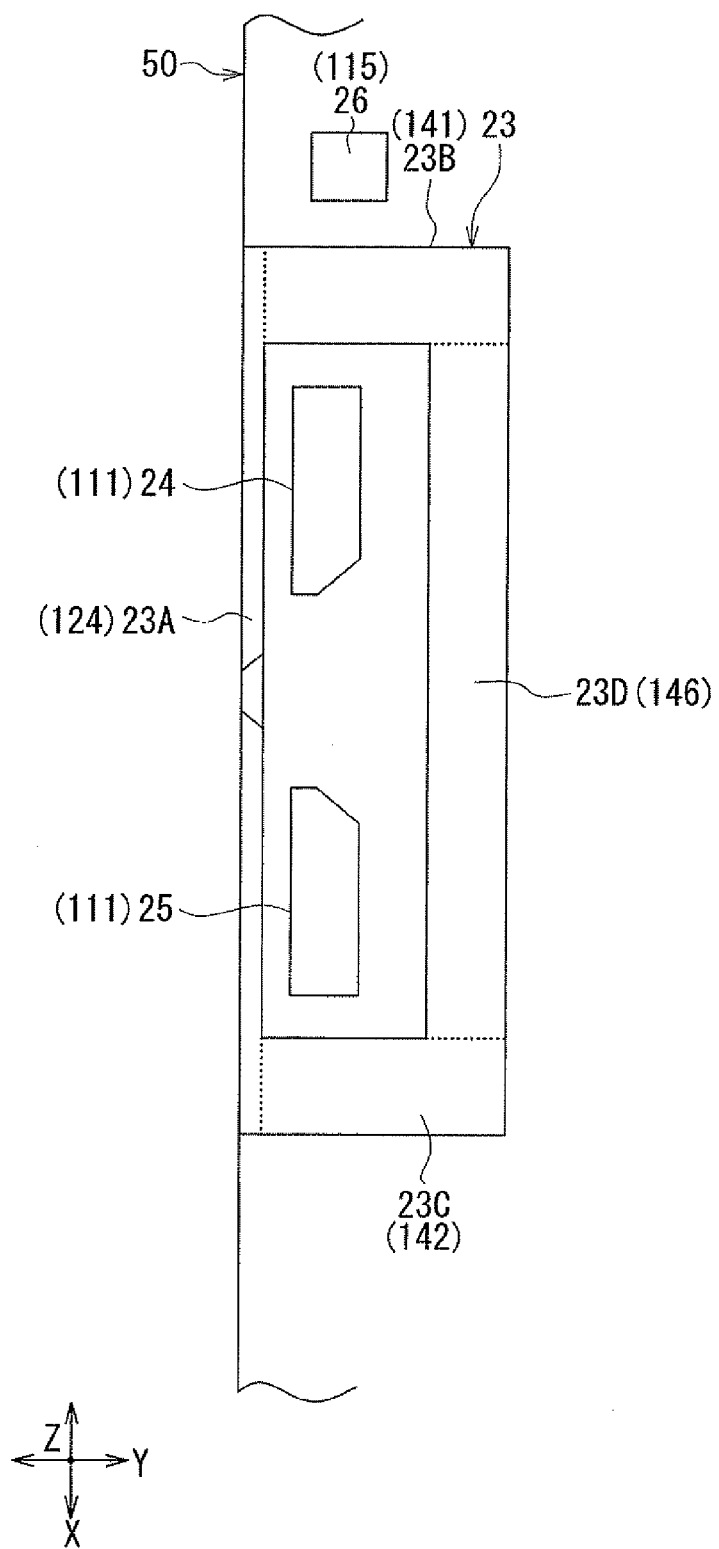
FIG. 6 is a plan view showing another portion of the first coil that is located on the front side in the direction of travel of the recording medium relative to the portion shown in FIG. 5.
Figure 7:
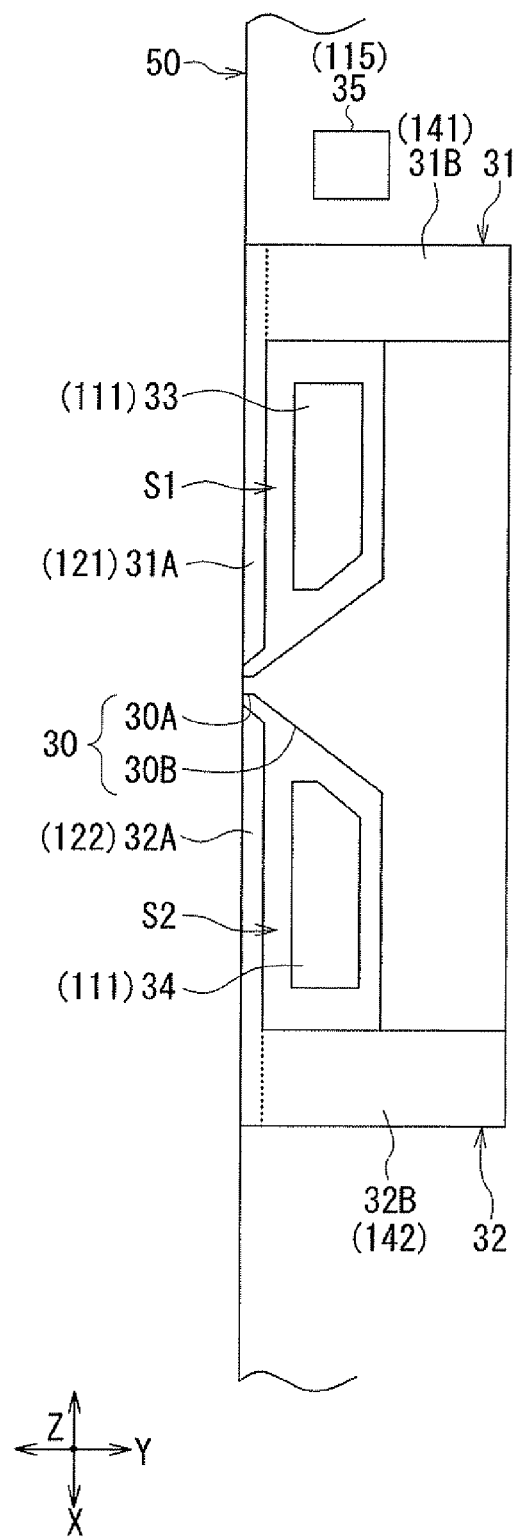
FIG. 7 is a plan view showing still another portion of the first coil that is located on the front side in the direction of travel of the recording medium relative to the portion shown in FIG. 6.
Figure 8:
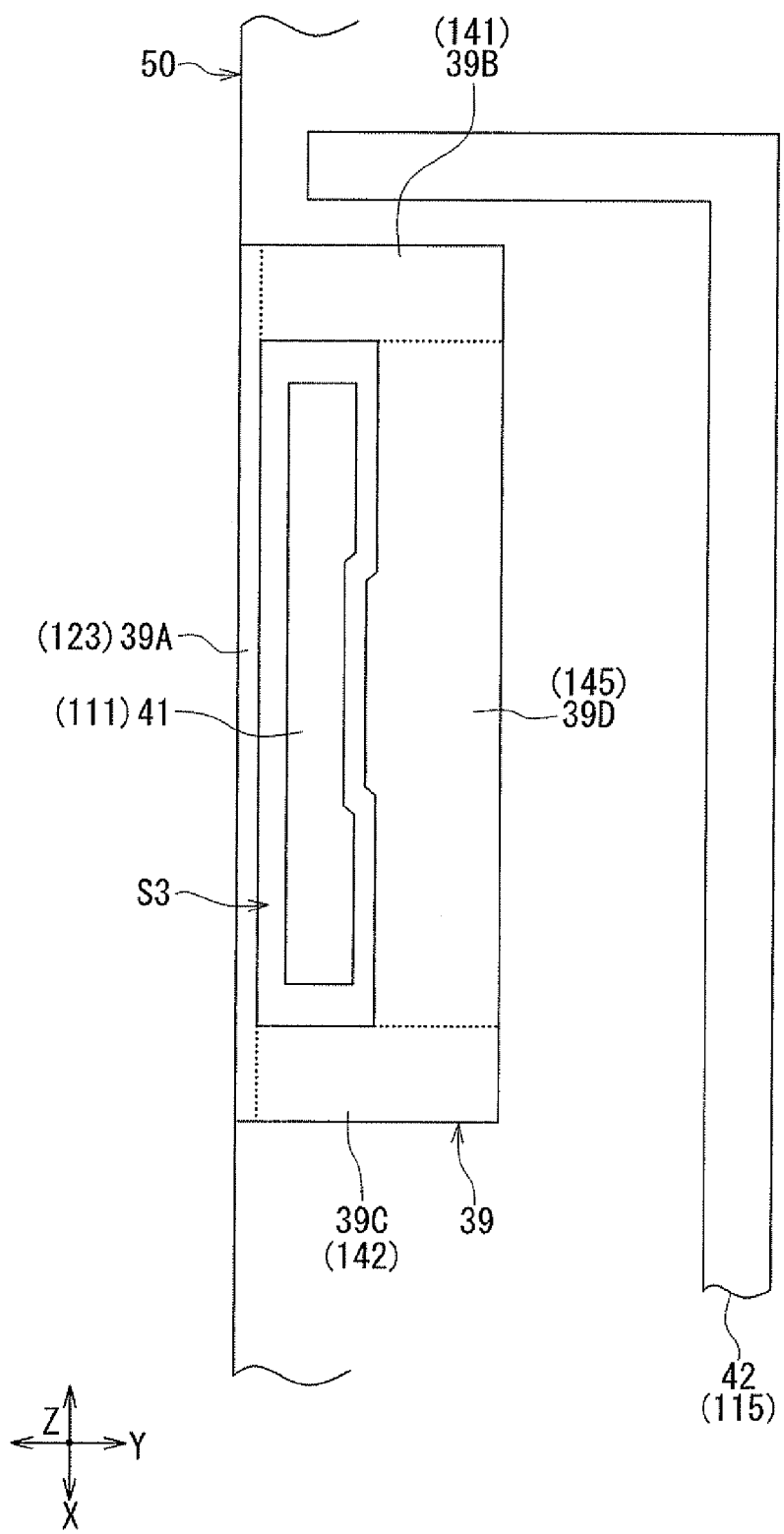
FIG. 8 is a plan view showing still another portion of the first coil that is located on the front side in the direction of travel of the recording medium relative to the portion shown in FIG. 7.

The configuration of the magnetic head according to the present embodiment will now be described in more detail with reference to FIG. 1 to FIG. 8. FIG. 4 is a plan view showing the second coil 112. FIG. 5 is a plan view showing a portion of the first coil 111. FIG. 6 is a plan view showing another portion of the first coil 111 that is located on the front side in the direction of travel of the recording medium relative to the portion shown in FIG. 5. FIG. 7 is a plan view showing still another portion of the first coil 111 that is located on the front side in the direction of travel of the recording medium relative to the portion shown in FIG. 6. FIG. 8 is a plan view showing still another portion of the first coil 111 that is located on the front side in the direction of travel of the recording medium relative to the portion shown in FIG. 7. The X, Y, and Z directions shown in FIG. 9 are also shown in FIG. 4 to FIG. 8.

As shown in FIG. 2 and FIG. 3, the magnetic head according to the present embodiment includes: a substrate 1 made of a ceramic material such as aluminum oxide-titanium carbide ($Al_2O_3$—TiC) and having a top surface; an insulating layer 2 made of an insulating material and disposed on the substrate 1; a bottom read shield layer 3 made of a magnetic material and disposed on the insulating layer 2; a magnetoresistive element (hereinafter referred to as MR element) 4 disposed on the bottom read shield layer 3; a top read shield layer 6 made of a magnetic material and disposed on the MR element 4; and an insulating layer 5 made of an insulating material, disposed between the bottom read shield layer 3 and the top read shield layer 6 and surrounding the MR element 4. The insulating layers 2 and 5 are made of alumina, for example. Note that FIG. 2 shows a cross section perpendicular to the medium facing surface 50 and to the top surface of the substrate 1.

An end of the MR element 4 is located in the medium facing surface 50. The MR element 4 may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the planes of layers constituting the GMR element or the current-perpendicular-to-plane (CPP) type in which the sense current is fed in a direction generally perpendicular to the planes of layers constituting the GMR element. Where the MR element 4 is a TMR element or a CPP-type GMR element, the bottom read shield layer 3 and the top read shield layer 6 may also serve as electrodes for feeding the sense current to the MR element 4. Where the MR element 4 is a CIP-type GMR element, insulating films are respectively provided between the MR element 4 and the bottom read shield layer 3 and between the MR element 4 and the top read shield layer 6, and two leads are provided between these insulating films in order to feed the sense current to the MR element 4.

The parts from the bottom read shield layer 3 to the top read shield layer 6 constitute the read head unit. The magnetic head further includes: a nonmagnetic layer 7 made of a nonmagnetic material and disposed on the top read shield layer 6; a middle shield layer 8 made of a magnetic material and disposed on the nonmagnetic layer 7; an insulating layer 9 disposed on the middle shield layer 8; and the write head unit disposed on the insulating layer 9. The middle shield layer 8 has the function of shielding the MR element 4 from magnetic fields generated in the write head unit. The nonmagnetic layer 7 and the insulating layer 9 are made of alumina, for example. The write head unit includes the first coil 111, the second coil 112, the leads 113, 114 and 115, the main pole 30, the write shield 120, the gap part 130, and the return path section 140. The first coil 111 is composed of a plurality of conductive layers described later.

As shown in FIG. 2, the magnetic head further includes a magnetic layer 10 made of a magnetic material and disposed on the insulating layer 9, and an insulating layer 11 disposed on the insulating layer 9 and surrounding the magnetic layer 10. The magnetic layer 10 has an end face that faces toward the medium facing surface 50, the end face being located at a distance from the medium facing surface 50. The magnetic layer 10 forms part of the fourth yoke portion 144. The insulating layer 11 is made of alumina, for example.

The magnetic head further includes magnetic layers 12 and 13 each made of a magnetic material. The magnetic layer 12 has an end face that faces toward the medium facing surface 50, the end face being located at a distance from the medium facing surface 50. As shown in FIG. 4, the magnetic layer 12 includes a central portion extending in the X direction, and two side portions extending in the Y direction from the vicinities of opposite ends in the X direction of the central portion. The central portion lies on the magnetic layer 10 and the insulating layer 11. The two side portions lie on the magnetic layer 10. The magnetic layer 13 is located between and spaced from the two side portions at a location farther from the medium facing surface 50 relative to the central portion, and lies on the magnetic layer 10. The magnetic layer 12 forms part of the fourth yoke portion 144. The magnetic layer 13 forms part of the second coupling portion 146.

The magnetic head further includes an insulating layer 14 lying on the magnetic layer 10 and the insulating layer 11 and surrounding the magnetic layers 12 and 13, and a conductive layer 15 made of a nonmagnetic conductive material and lying on the insulating layer 14. The insulating layer 14 is made of alumina, for example. The conductive layer 15 forms the second coil 112 and the leads 113 and 114. In FIG. 4, the boundary between the second coil 112 and the lead 113 and the boundary between the second coil 112 and the lead 114 are indicated by dotted lines. As shown in FIG. 4, the second coil 112 is wound approximately one turn around the magnetic layer 13. When viewed from above, the second coil 112 is wound in a counterclockwise direction from the boundary between the second coil 112 and the lead 113 to the boundary between the second coil 112 and the lead 114.

The magnetic head further includes an insulating layer 16 disposed around the magnetic layers 12 and 13 and the conductive layer 15. The insulating layer 16 is made of alumina, for example.

The magnetic head further includes magnetic layers 17 and 18 each made of a magnetic material. The magnetic layer 17 has an end face located in the medium facing surface 50, and lies on the central portion of the magnetic layer 12 and the insulating layer 16. The magnetic layer 17 extends in the X direction. The magnetic layer 18 is located farther from the medium facing surface 50 than is the magnetic layer 17, and lies on the two side portions of the magnetic layer 12 and the magnetic layer 13. The magnetic layer 18 extends in the X direction. The magnetic layer 17 forms part of the fourth shield portion 124. The magnetic layer 18 forms part of the second coupling portion 146.

The magnetic head further includes two conductive layers 19 and 20 each made of a nonmagnetic conductive material and disposed between the magnetic layer 17 and the magnetic layer 18. The conductive layers 19 and 20 are spaced from each other and aligned in the track width direction (the X direction). The conductive layers 19 and 20 are drawn from the space defined by the magnetic layers 17 and 18 in opposite directions along the X direction. The conductive layers 19 and 20 form part of the first coil 111.

The magnetic head further includes: an insulating layer 21 interposed between the magnetic layer 18 and the conductive layer 15 and between a combination of the conductive layers 19 and 20 and a combination of the magnetic layer 12 and the conductive layer 15; and an insulating layer 22 lying on the insulating layer 21 and surrounding the magnetic layers 17 and 18 and the conductive layers 19 and 20. A portion of the conductive layer 20 near its end farthest from the conductive layer 19 penetrates the insulating layer 21 to establish electrical connection to the conductive layer 15. The insulating layers 21 and 22 are made of alumina, for example.

The magnetic head further includes a magnetic layer 23 made of a magnetic material. The magnetic layer 23 has an end face located in the medium facing surface 50 and lies on the magnetic layers 17 and 18. As shown in FIG. 6, the magnetic layer 23 includes a portion 23A forming part of the fourth shield portion 124, a portion 23B forming part of the first yoke portion 141, a portion 23C forming part of the second yoke portion 142, and a portion 23D forming part of the second coupling portion 146. In FIG. 6, the boundary between the portions 23A and 23B, the boundary between the portions 23A and 23C, the boundary between the portions 23B and 23D, and the boundary between the portions 23C and 23D are indicated by dotted lines.

The portion 23A extends in the X direction and includes the aforementioned end face of the magnetic layer 23 and an inclined surface facing toward the main pole 30. The portions 23B and 23C are connected to parts of the portion 23A near its opposite ends in the X direction, and extend in the Y direction from the respective boundaries with the portion 23A. The portion 23D extends in the X direction, lying between the portions 23B and 23C at a location farther from the medium facing surface 50 relative to the portion 23A. Opposite ends of the portion 23D are connected to the portions 23B and 23C, respectively. The top surfaces of the portions 23B and 23C are located at the same level as the top surface of the portion 23D in the direction of travel of the recording medium.

The magnetic head further includes a conductive layer 24 disposed on a portion of the conductive layer 19 near its end closest to the conductive layer 20, a conductive layer 25 disposed on a portion of the conductive layer 20 near its end closest to the conductive layer 19, and a conductive layer 26 disposed on a portion of the conductive layer 19 near its end farthest from the conductive layer 20. As shown in FIG. 6, the conductive layers 24 and 25 are located in the space defined by the portions 23A to 23D of the magnetic layer 23, spaced from each other and aligned in the track width direction (the X direction). The conductive layer 26 lies outside the aforementioned space. The conductive layers 24 and 25 form part of the first coil 111. The conductive layer 26 forms part of the lead 115.

The conductive layers 24 to 26 may be formed of a magnetic conductive material or a nonmagnetic conductive material. If the conductive layers 24 to 26 are formed of a magnetic conductive material, the conductive layers 24 and 25 correspond to the magnetic portion of the first coil 111 while the conductive layer 26 corresponds to the magnetic portion of the lead 115. In this case, the magnetic layer 23, which forms part of each of the write shield 120 and the return path section 140, may be formed of the same material as the conductive layers 24 to 26. If the conductive layers 24 to 26 are formed of a nonmagnetic conductive material, the conductive layers 24 and 25 correspond to the nonmagnetic portion of the first coil 111 while the conductive layer 26 corresponds to the nonmagnetic portion of the lead 115.

The magnetic head further includes: an insulating layer 27 interposed between the conductive layer 19 and the portion 23B of the magnetic layer 23 and between the conductive layer 20 and the portion 23C of the magnetic layer 23; and an insulating layer 28 lying on the insulating layer 27 and surrounding the magnetic layer 23 and the conductive layers 24 to 26. The insulating layers 27 and 28 are made of alumina, for example.

The magnetic head further includes magnetic layers 31 and 32 each made of a magnetic material. The magnetic layer 31 has an end face located in the medium facing surface 50 and lies on a part of the magnetic layer 23. The magnetic layer 32 has an end face located in the medium facing surface 50 and lies on another part of the magnetic layer 23. As shown in FIG. 7, the magnetic layer 31 includes a portion 31A forming the first shield portion 121 and a portion 31B forming part of the first yoke portion 141. The magnetic layer 32 includes a portion 32A forming the second shield portion 122 and a portion 32B forming part of the second yoke portion 142. In FIG. 6, the boundary between the portions 31A and 31B and the boundary between the portions 32A and 32B are indicated by dotted lines.

The portion 31A includes the aforementioned end face of the magnetic layer 31 and extends in the X direction. The portion 32A includes the aforementioned end face of the magnetic layer 32 and extends in the X direction. The portions 31A and 32A are spaced from each other, disposed on the portion 23A of the magnetic layer 23 and aligned in the track width direction. The portion 31B is connected to a part of the portion 31A near its end farthest from the portion 32A, and extends in the Y direction from the boundary between the portions 31A and 31B. The portion 32B is connected to a part of the portion 32A near its end farthest from the portion 31A, and extends in the Y direction from the boundary between the portions 32A and 32B. The portions 31B and 32B are disposed on the portions 23B and 23C of the magnetic layer 23, respectively.

The magnetic head further includes a nonmagnetic layer 29 made of an insulating nonmagnetic material. The nonmagnetic layer 29 covers part of the end of the main pole 30 and part of each of the two side surfaces of the main pole 30. The main pole 30 is disposed over the portions 23A and 23D of the magnetic layer 23 and the insulating layer 28 such that the nonmagnetic layer 29 is interposed between the main pole 30 and each of the portion 23A of the magnetic layer 23, the portion 31A of the magnetic layer 31, the portion 32A of the magnetic layer 32 and the insulating layer 28, and such that portions of the main pole 30 located away from the medium facing surface 50 are connected to the portion 31B of the magnetic layer 31 and the portion 32B of the magnetic layer 32, respectively. A portion of the bottom end of the main pole 30 located away from the medium facing surface 50 is in contact with the top surface of the second coupling portion 146 formed by the portion 23D. The nonmagnetic layer 29 is made of alumina, for example.

A portion of the main pole 30 in the vicinity of the medium facing surface 50 is located at a predetermined distance from the first, second and fourth shield portions 121, 122 and 124 formed by the portions 23A, 31A and 32A of the magnetic layers 23, 31 and 32. A portion of the nonmagnetic layer 29 that is interposed between the main pole 30 and each of the portions 23A, 31A and 32A forms the first gap portion 130A.

As shown in FIG. 7, the main pole 30 includes a track width defining portion 30A having an end face located in the medium facing surface 50 and an end opposite thereto, and a wide portion 30B connected to the end of the track width defining portion 30A. The top surface of the main pole 30 includes the top surface of the track width defining portion 30A and the top surface of the wide portion 30B. The top surface of the wide portion 30B is greater than the top surface of the track width defining portion 30A in width in the track width direction.

The width of the top surface of the track width defining portion 30A in the track width direction is generally constant regardless of the distance from the medium facing surface 50. The width of the top surface of the wide portion 30B in the track width direction is, for example, equal to that of the top surface of the track width defining portion 30A when seen at the boundary between the track width defining portion 30A and the wide portion 30B, and gradually increases with increasing distance from the medium facing surface 50, then becoming constant. Note that the track width defining portion 30A may be omitted to configure the wide portion 30B to have an end face located in the medium facing surface 50. Further, relative to a direction perpendicular to the medium facing surface 50, two edges of the top surface of the wide portion 30B that are opposite in the track width direction may each form an angle that is constant regardless of the distance from the medium facing surface 50 or that varies with distance from the medium facing surface 50.

The magnetic head further includes a conductive layer 33 disposed on the conductive layer 24, a conductive layer 34 disposed on the conductive layer 25, and a conductive layer 35 disposed on the conductive layer 26. As shown in FIG. 7, the conductive layers 33 and 34 are located on opposite sides of the main pole 30 in the track width direction (the X direction), each being spaced from the main pole 30. The conductive layers 33 and 34 form part of the first coil 111. The conductive layer 35 forms part of the lead 115.

The conductive layers 33 to 35 may be formed of a magnetic conductive material or a nonmagnetic conductive material. If the conductive layers 33 to 35 are formed of a magnetic conductive material, the conductive layers 33 and 34 correspond to the magnetic portion of the first coil 111 while the conductive layer 35 corresponds to the magnetic portion of the lead 115. In this case, the magnetic layers 31 and 32, which form part of each of the write shield 120 and the return path section 140, may be formed of the same material as the conductive layers 33 to 35. If the conductive layers 33 to 35 are formed of a nonmagnetic conductive material, the conductive layers 33 and 34 correspond to the nonmagnetic portion of the first coil 111 while the conductive layer 35 corresponds to the nonmagnetic portion of the lead 115.

The magnetic head further includes an insulating layer 36 disposed around the main pole 30, the magnetic layers 31 and 32 and the conductive layers 33 to 35, and a nonmagnetic layer 37 disposed on part of the first flat portion of the top surface of the main pole 30. The nonmagnetic layer 37 is used as a mask when forming the first inclined portion of the top surface of the main pole 30 by, for example, ion milling. The insulating layer 36 is made of alumina, for example. The nonmagnetic layer 37 is made of a nonmagnetic metal material such as Ru or Ta.

The magnetic head further includes a nonmagnetic layer 38 made of an insulating nonmagnetic material and lying on the main pole 30, the portions 31A and 32A of the magnetic layers 31 and 32 and the nonmagnetic layers 29 and 37. The nonmagnetic layer 38 does not cover a portion of the top surface of the main pole 30 located away from the medium facing surface 50. The nonmagnetic layer 38 is made of alumina, for example.

The magnetic head further includes a magnetic layer 39 made of a magnetic material. The magnetic layer 39 has an end face located in the medium facing surface 50 and lies on the main pole 30, the magnetic layers 31 and 32 and the nonmagnetic layer 38. As shown in FIG. 8, the magnetic layer 39 includes a portion 39A forming the third shield portion 123, a portion 39B forming part of the first yoke portion 141, a portion 39C forming part of the second yoke portion 142, and a portion 39D forming the first coupling portion 145. In FIG. 8, the boundary between the portions 39A and 39B, the boundary between the portions 39A and 39C, the boundary between the portions 39B and 39D, and the boundary between the portions 39C and 39D are indicated by dotted lines.

The portion 39A includes the aforementioned end face of the magnetic layer 39 and extends in the X direction. The portions 39B and 39C are connected to parts of the portion 39A near its opposite ends in the X direction, and extend in the Y direction from the respective boundaries with the portion 39A. The portion 39D extends in the X direction, lying between the portions 39B and 39C at a location farther from the medium facing surface 50 relative to the portion 39A. Opposite ends of the portion 39D are connected to the portions 39B and 39C, respectively. A portion of the top surface of the main pole 30 located away from the medium facing surface 50 is in contact with the bottom surface of the first coupling portion 145 formed by the portion 39D.

A portion of the nonmagnetic layer 38 that is interposed between the main pole 30 and the portion 39A (the third shield portion 123) forms the second gap portion 130B. In the medium facing surface 50, a portion of the end face of the magnetic layer 39 (the third end face portion 123a) is separated from the end face of the main pole 30 by a predetermined distance created by the thickness of the second gap portion 130B. The thickness of the second gap portion 130B is preferably 200 nm or smaller, and more preferably falls within the range of 15 to 50 nm.

The magnetic head further includes an insulating layer 40 lying on the insulating layer 36 and the nonmagnetic layer 38 and surrounding the magnetic layer 39. The insulating layer 40 has three openings for exposing the top surfaces of the conductive layers 33 to 35. The insulating layer 40 is made of alumina, for example.

The magnetic head further includes a conductive layer 41 made of a nonmagnetic conductive material, located in the space defined by the portions 39A to 39D of the magnetic layer 39 and lying on the conductive layers 33 and 34 and the insulating layer 40, and a conductive layer 42 made of a nonmagnetic conductive material, located outside the aforementioned space and lying on the conductive layer 35 and the insulating layer 40. The conductive layer 41 extends in the X direction. Portions of the conductive layer 41 near its opposite ends in the longitudinal direction are in contact with the conductive layers 33 and 34, respectively. A portion of the conductive layer 42 near its end in the longitudinal direction is in contact with the conductive layer 35. The conductive layer 41 forms part of the first coil 111. The conductive layer 42 forms part of the lead 115.

The magnetic head further includes an insulating layer 43 lying on the insulating layer 40 and surrounding the magnetic layer 39 and the conductive layers 41 and 42, an insulating layer 44 lying on the conductive layers 41 and 42 and the insulating layer 43, and a magnetic layer 45 lying on the magnetic layer 39 and the insulating layer 44. The insulating layers 43 and 44 are made of alumina, for example. The magnetic layer 45 has an end face located in the medium facing surface 50. The magnetic layer 45 forms the third yoke portion 143.

The magnetic head further includes a protective layer 46 made of an insulating material such as alumina and disposed to cover the write head unit. The base body 211 shown in FIG.

9 is mainly composed of the substrate 1 and the protective layer 46 shown in FIG. 2 and FIG. 3.

As has been described, the magnetic head according to the present embodiment has the medium facing surface 50, the read head unit, and the write head unit. The read head unit and the write head unit are stacked on the substrate 1. The read head unit is located on the rear side in the direction of travel of the recording medium (the Z direction), i.e., the leading side, relative to the write head unit.

The write head unit includes the first coil 111, the second coil 112, the leads 113, 114 and 115, the main pole 30, the write shield 120, the gap part 130, the return path section 140, and the core part.

The first coil 111 is formed of the conductive layers 19, 20, 24, 25, 33, 34 and 41. The second coil 112 and the leads 113 and 114 are formed of the conductive layer 15. The lead 115 is formed of the conductive layers 26, 35 and 42.

The write shield 120 includes the first to fourth shield portions 121 to 124. The first shield portion 121 is formed of the portion 31A of the magnetic layer 31. The second shield portion 122 is formed of the portion 32A of the magnetic layer 32. The third shield portion 123 is formed of the portion 39A of the magnetic layer 39. The fourth shield portion 124 is formed of the magnetic layer 17 and the portion 23A of the magnetic layer 23.

The gap part 130 includes the first and second gap portions 130A and 130B. The first gap portion 130A is formed of the portion of the nonmagnetic layer 29 interposed between the main pole 30 and each of the portions 23A, 31A and 32A of the magnetic layers 23, 31 and 32 (the first, second and fourth shield portions 121, 122 and 124). The second gap portion 130B is formed of the portion of the nonmagnetic layer 38 interposed between the main pole 30 and the portion 39A of the magnetic layer 39 (the third shield portion 123).

The return path section 140 includes the first to fourth yoke portions 141 to 144 and the first and second coupling portions 145 and 146. The first yoke portion 141 is formed of the portions 23B, 31B and 39B of the magnetic layers 23, 31 and 39. The second yoke portion 142 is formed of the portions 23C, 32B and 39C of the magnetic layers 23, 32 and 39. The third yoke portion 143 is formed of the magnetic layer 45. The fourth yoke portion 144 is formed of the magnetic layers 10 and 12. The first coupling portion 145 is formed of the portion 39D of the magnetic layer 39. The second coupling portion 146 is formed of the magnetic layers 13 and 18 and the portion 23D of the magnetic layer 23.

The function and effects of the magnetic head according to the present embodiment will now be described. The magnetic head writes data on a recording medium by using the write head unit and reads data stored on a recording medium by using the read head unit. In the write head unit, the first and second coils 111 and 112 produce magnetic fields corresponding to data to be written on a recording medium. The main pole 30 allows magnetic fluxes corresponding to the magnetic fields produced by the first and second coils 111 and 112 to pass, and produces a write magnetic field for writing data on the recording medium by means of a perpendicular magnetic recording system.

The write shield 120 captures a disturbance magnetic field applied to the magnetic head from the outside thereof. This prevents the disturbance magnetic field from being intensively captured into the main pole 30 and inducing erroneous writing on the recording medium. Further, the write shield 120 has the function of capturing a magnetic flux that is produced from the end face of the main pole 30 and spreads in directions other than the direction perpendicular to the plane of the recording medium, so as to prevent the magnetic flux from reaching the recording medium. Moreover, the write shield 120 and the return path section 140 have the function of allowing a magnetic flux that has been produced from the end face of the main pole 30 and has magnetized the recording medium to flow back to the main pole 30.

In the present embodiment, the write shield 120 includes the first and second shield portions 121 and 122 located on opposite sides of the main pole 30 in the track width direction, and the return path section 140 includes the first and second yoke portions 141 and 142 located on opposite sides of the main pole 30 in the track width direction. The first coil 111 passes through the first and second spaces S1 and S2 so as to surround at least part of the entire outer periphery of the main pole 30 when viewed from the medium facing surface 50. By virtue of these features, the present embodiment allows for making full use of the function of the write shield 120 and preventing unwanted erasure. This advantageous effect will be described in detail below.

In the present embodiment, a magnetic flux having been captured into the first shield portion 121 flows toward the first yoke portion 141, while a magnetic flux having been captured into the second shield portion 122 flows toward the second yoke portion 142. More specifically, in the present embodiment, the magnetic fluxes having been captured into the first and second shield portions 121 and 122 located on opposite sides of the main pole 30 in the track width direction flow smoothly, with hardly any restriction imposed by the magnetic path structure, toward the first and second yoke portions 141 and 142 located on opposite sides of the main pole 30 in the track width direction, and flow back to the main pole 30. Thus, the present embodiment makes it possible to capture a sufficient amount of magnetic flux into the write shield 120 from the first and second shield portions 121 and 122, and prevent the magnetic flux having been captured into the write shield 120 from leaking out of the write shield 120. Consequently, the present embodiment allows for making full use of the function of the write shield 120 and preventing unwanted erasure.

Now, a magnetic head of a comparative example having the following configuration will be contemplated for comparison with the magnetic head according to the present embodiment. The magnetic head of the comparative example does not have the first and second yoke portions 141 and 142 of the present embodiment, and instead has a first return yoke located on the trailing side relative to the main pole 30 and connected to the write shield 120, a second return yoke located on the leading side relative to the main pole 30 and connected to the write shield 120, a first coupling part coupling the first return yoke to part of the main pole 30 located away from the medium facing surface 50, and a second coupling part coupling the second return yoke to part of the main pole 30 located away from the medium facing surface 50. Further, the magnetic head of the comparative example has a coil having a first winding portion wound around the first coupling part and a second winding portion wound around the second coupling part, in place of the first and second coils 111 and 112 of the present embodiment. U.S. Patent Application Publication No. 2005/0128637 A1 discloses a magnetic head having a configuration similar to that of the magnetic head of the comparative example.

In the magnetic head of the comparative example, a magnetic flux having been captured into each of the first and second shield portions 121 and 122 located on opposite sides of the main pole 30 in the track width direction bifurcates into two separate flows: one toward the first return yoke; and the other toward the second return yoke. At this time, the magnetic flux passes through a magnetic path composed of a plurality of magnetic layers stacked one on another. The magnetic path includes one or more boundaries between two adjacent magnetic layers, the one or more boundaries being exposed in the medium facing surface 50. In the vicinity of the one or more boundaries, magnetic flux tends to leak from within the magnetic path to the outside thereof. This may result in the occurrence of unwanted erasure. The occurrence of unwanted erasure may become noticeable particularly when the two adjacent magnetic layers are made of different materials.

In contrast to this, the magnetic head according to the present embodiment is configured so that neither the magnetic path passing through the first shield portion 121 and the first yoke portion 141 nor the magnetic path passing through the second shield portion 122 and the second yoke portion 142 includes any boundary between two magnetic layers that is exposed in the medium facing surface 50. Thus, the present embodiment makes it possible to prevent the occurrence of unwanted erasure attributable to a boundary between two magnetic layers.

Now, a comparison will be made between the operation of the magnetic head of the comparative example and that of the magnetic head according to the present embodiment when the width of the second gap portion 130B in the track width direction is greater than the distance between the first shield portion 121 and the second shield portion 122 in the medium facing surface 50, as shown in FIG. 3. In the magnetic head of the comparative example, as described above, a magnetic flux having been captured into each of the first and second shield portions 121 and 122 bifurcates into two separate flows: one toward the first return yoke; and the other toward the second return yoke. The flow of the magnetic flux toward the first return yoke from each of the first and second shield portions 121 and 122 is restricted on the way by the second gap portion 130B which is large in width in the track width direction. Thus, in the vicinity of the second gap portion 130B, the magnetic flux tends to leak from within the write shield 120 to the outside thereof. This may result in the occurrence of unwanted erasure.

In contrast to this, in the magnetic head according to the present embodiment, magnetic fluxes having been captured into the first and second shield portions 121 and 122 flow toward the first and second yoke portions 141 and 142, respectively, as described above. Therefore, the flows of the magnetic fluxes will not be restricted by the second gap portion 130B. Thus, the present embodiment allows for preventing the occurrence of unwanted erasure attributable to the second gap portion 130B.

For the foregoing reasons, the present embodiment allows for making full use of the function of the write shield 120 and preventing unwanted erasure.

With increases in frequency of write signals for higher recording densities, it is required of the write head unit to provide an improved rate of change in the direction of the magnetic flux produced from the end face of the main pole 30. To satisfy this requirement, it is effective to reduce the length of the return path section 140. To that end, it is effective to reduce the number of turns of the first coil 111. Reducing the number of turns of the first coil 111, however, results in a smaller magnetomotive force of the first coil 111 and thus gives rise to the problem that the minimum write current value is increased.

To address this problem, the magnetic head according to the present embodiment is provided with the second coil 112 which surrounds at least part of the second coupling portion 146 or the core part. The present embodiment thus makes it possible to obtain a sufficient magnetomotive force from the first and second coils 111 and 112. Consequently, the present embodiment allows for reducing the minimum write current value.

Further, in the present embodiment, the second coil 112 passes through neither of the first and second spaces S1 and S2. Accordingly, the presence of the second coil 112 never increases the length of a magnetic path of the return path section 140 that passes through the first yoke portion 141 and connects the write shield 120 and part of the main pole 30 located away from the medium facing surface 50 to each other, and the length of a magnetic path of the return path section 140 that passes through the second yoke portion 142 and connects the write shield 120 and part of the main pole 30 located away from the medium facing surface 50 to each other. Further, in the present embodiment, the second coil 112 is located on the rear side in the direction of travel of the recording medium relative to the main pole 30, and thus does not pass through the third space S3, either. This avoids an increase in length of a magnetic path of the return path section 140 that passes through the third yoke portion 143 and connects the write shield 120 and part of the main pole 30 located away from the medium facing surface 50 to each other.

Consequently, the present embodiment allows the return path section 140 to be small in length and allows the first and second coils 111 and 112 to generate a sufficient magnetomotive force.

The first coil 111 and the second coil 112 produce magnetic fields in the same direction in the main pole 30. In this case, the direction of magnetic fields produced in the first and second yoke portions 141 and 142 by the first coil 111 and the direction of magnetic fields produced in the first and second yoke portions 141 and 142 by the second coil 112 are opposite to each other. To prevent unwanted erasure, it is necessary that the strength of the magnetic fields produced in the first and second yoke portions 141 and 142 by the first coil 111 be greater than the strength of the magnetic fields produced in the first and second yoke portions 141 and 142 by the second coil 112. The present embodiment achieves this. The reason therefor will now be conceptually described.

To facilitate understanding, the description will be made on the assumption of the following simplified structure and conditions. Specifically, assuming that the first coil 111 and the second coil 112 generate equal magnetomotive forces, we consider magnetic fluxes produced by the first and second coils 111 and 112 in the main pole 30 and the first and second yoke portions 141 and 142, which are essential components of the magnetic head of the present invention. In this case, the entire magnetic flux produced by the first coil 111 and flowing through the main pole 30 is substantially a combination of the magnetic flux produced by the first coil 111 and flowing through the first yoke portion 141 and the magnetic flux produced by the first coil 111 and flowing through the second yoke portion 142. Thus, the magnetic flux produced by the first coil 111 and flowing through the first yoke portion 141 and the magnetic flux produced by the first coil 111 and flowing through the second yoke portion 142 are each approximately ½ the entire magnetic flux produced by the first coil 111.

On the other hand, the entire magnetic flux produced by the second coil 112 trifurcates into three separate flows: one toward the main pole 30; another toward the first yoke portion 141; and the other toward the second yoke portion 142. Accordingly, the magnetic flux produced by the second coil 112 and flowing through the first yoke portion 141 and the magnetic flux produced by the second coil 112 and flowing through the second yoke portion 142 are each smaller than ½ the entire magnetic flux produced by the second coil 112.

Consequently, the strength of the magnetic fields produced in the first and second yoke portions 141 and 142 by the first coil 111 is greater than the strength of the magnetic fields produced in the first and second yoke portions 141 and 142 by the second coil 112.

The other effects provided by the present embodiment will now be described. The conductive layers 24 and 25 forming part of the first coil 111 and the conductive layer 26 forming part of the lead 115 are located at the same level as the magnetic layer 23 in the direction of travel of the recording medium. The magnetic layer 23 forms part of each of the write shield 120 and the return path section 140. Where the conductive layers 24 and 25 are formed of a magnetic conductive material into the magnetic portion of the first coil 111 and the conductive layer 26 is formed of a magnetic conductive material into the magnetic portion of the lead 115, the magnetic layer 23 may be formed of the same material as the conductive layers 24 to 26, and at the same time the conductive layers 24 to 26 are formed. This makes the manufacture of the magnetic head easier than in the case of forming the aforementioned portions separately.

Similarly, the conductive layers 33 and 34 forming another part of the first coil 111 and the conductive layer 35 forming another part of the lead 115 are located at the same level as the magnetic layers 31 and 32 in the direction of travel of the recording medium. The magnetic layers 31 and 32 form another part of each of the write shield 120 and the return path section 140. Where the conductive layers 33 and 34 are formed of a magnetic conductive material into the magnetic portion of the first coil 111 and the conductive layer 35 is formed of a magnetic conductive material into the magnetic portion of the lead 115, the magnetic layers 31 and 32 may be formed of the same material as the conductive layers 33 to 35, and at the same time the conductive layers 33 to 35 are formed. This makes the manufacture of the magnetic head easier than in the case of forming the aforementioned portions separately.

Second Embodiment

Figure 13:
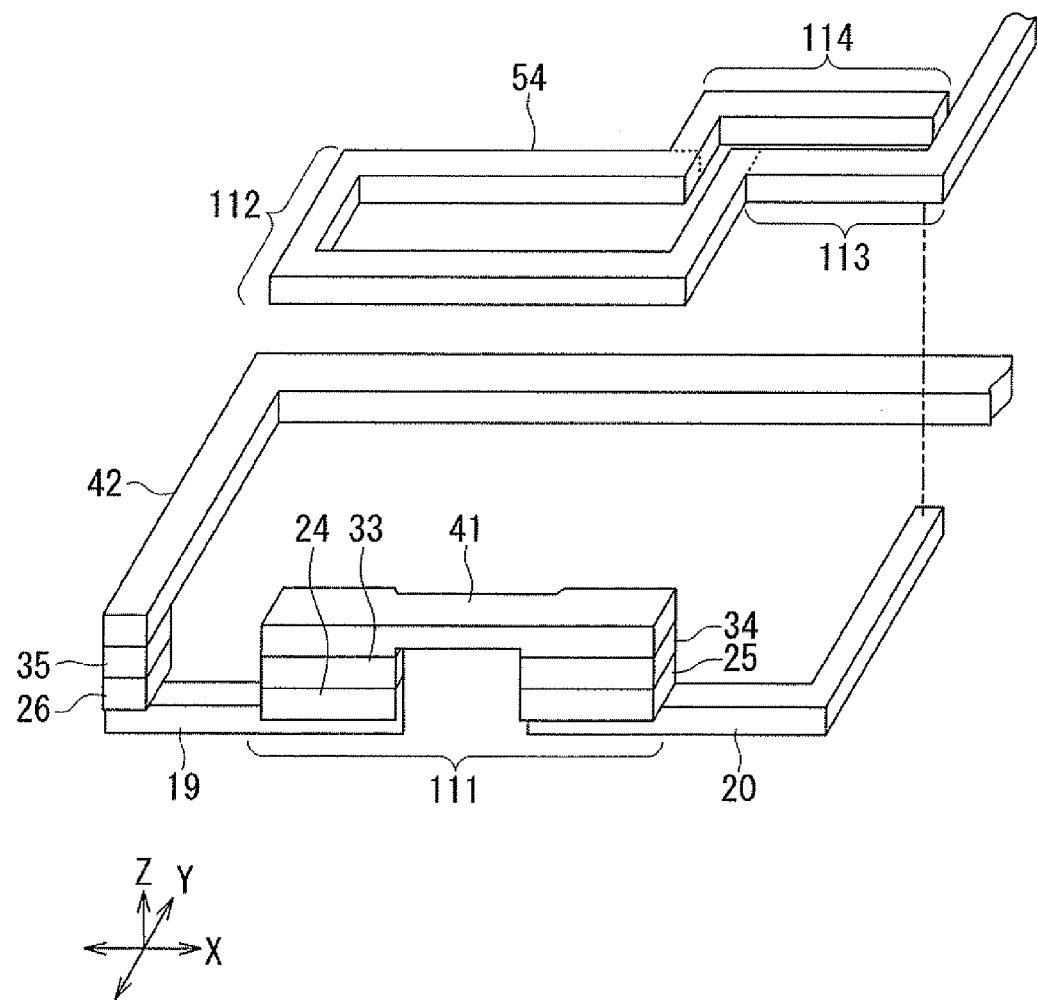
FIG. 13 is a perspective view showing first and second coils of a magnetic head according to a second embodiment of the invention.
Figure 14:
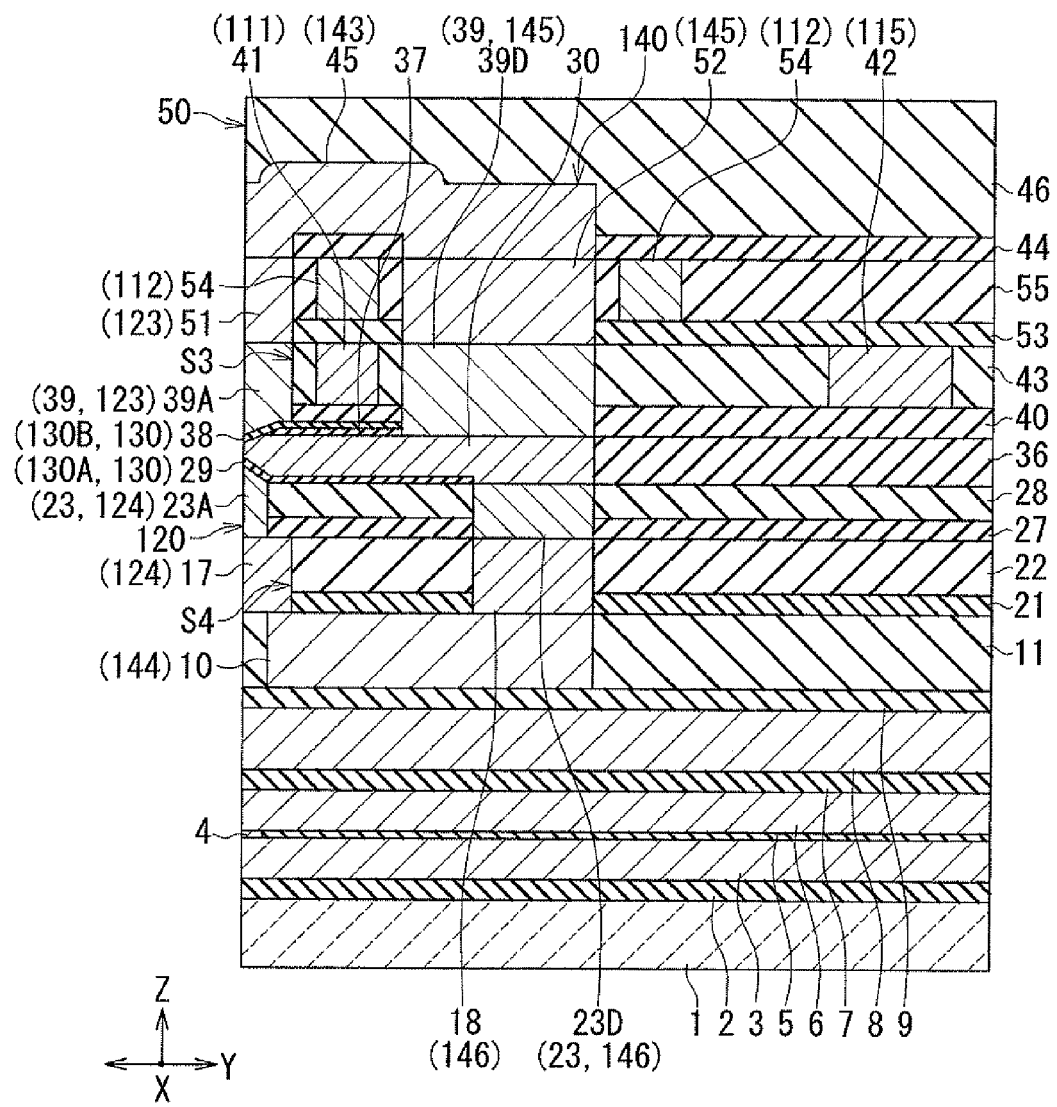
FIG. 14 is a cross-sectional view showing the configuration of the magnetic head according to the second embodiment of the invention.

A second embodiment of the invention will now be described with reference to FIG. 13 and FIG. 14. FIG. 13 is a perspective view showing the first and second coils of the magnetic head according to the present embodiment. FIG. 14 is a cross-sectional view showing the configuration of the magnetic head according to the present embodiment.

The magnetic head according to the present embodiment differs from the magnetic head according to the first embodiment in the following ways. In the magnetic head according to the present embodiment, the second soil 112 is located on the front side in the direction of travel of the recording medium (the Z direction) relative to the main pole 30, passes through neither of the first and second spaces S1 and S2 (see FIG. 3 and FIG. 7) and surrounds at least part of the first coupling portion 145 of the return path section 140. In the present embodiment, in particular, the second coil 112 is located on the front side in the direction of travel of the recording medium relative to the first coil 111, and surrounds substantially the entire outer periphery of the first coupling portion 145 when viewed from above. In the present embodiment, the first coupling portion 145 corresponds to the "core part" of the present invention. The first coupling portion (the core part) 145 is magnetically connected to part of the main pole 30 located away from the medium facing surface 50.

In the present embodiment, in particular, the third yoke portion 143 of the return path section 140 couples the third shield portion 123 of the write shield 120 and the first coupling portion (the core part) 145 to each other so that the third space S3 is defined by the main pole 30, the gap part 130, the third shield portion 123, the third yoke portion 143, and the first coupling portion (the core part) 145. The second coil 112 passes through the third space S3. In other words, the second coil 112 includes a portion passing through the third space S3.

In the present embodiment, the lead 113 connected to one end of the second coil 112 and the lead 114 connected to the other end of the second coil 112 are both located on the front side in the direction of travel of the recording medium relative to the main pole 30. In FIG. 13, the boundary between the second coil 112 and the lead 113 and the boundary between the second coil 112 and the lead 114 are indicated by dotted lines.

The configuration of the magnetic head according to the present embodiment will now be described in more detail. The magnetic head according to the present embodiment does not have the magnetic layers 12 and 13, the conductive layer 15 and the insulating layers 14 and 16. The magnetic layer 17 lies on the magnetic layer 10 and the insulating layer 11. The magnetic layer 18 is located farther from the medium facing surface 50 than is the magnetic layer 17 and lies on the magnetic layer 10. The insulating layer 21 is interposed between the magnetic layer 10 and each of the conductive layers 19 and 20 (see FIG. 5).

The magnetic head according to the present embodiment includes magnetic layers 51 and 52 each made of a magnetic material. The magnetic layer 51 has an end face located in the medium facing surface 50 and lies on the portions 39A to 39C (see FIG. 8) of the magnetic layer 39. The magnetic layer 52 is spaced from the magnetic layer 51 and lies on the portion 39D (see FIG. 8) of the magnetic layer 39. In the present embodiment, the third shield portion 123 of the write shield 120 is formed of the portion 39A of the magnetic layer 39 and the magnetic layer 51. The first coupling portion 145 of the return path section 140 is formed of the portion 39D of the magnetic layer 39 and the magnetic layer 52.

The magnetic head further includes an insulating layer 53 lying on the conductive layers 41 and 42 and the insulating layer 43 and surrounding the insulating layers 51 and 52, and a conductive layer 54 made of a nonmagnetic conductive material and lying on the insulating layer 53. The insulating layer 53 is made of alumina, for example. The conductive layer 54 forms the second coil 112 and the leads 113 and 114. Although not illustrated, the second coil 112 is wound approximately one turn around the magnetic layer 52. When viewed from above, the second coil 112 is wound in a clockwise direction from the boundary between the second coil 112 and the lead 113 to the boundary between the second coil 112 and the lead 114.

The magnetic head further includes an insulating layer 55 disposed around the magnetic layers 51 and 52 and the conductive layer 54. The insulating layer 55 is made of alumina, for example. In the present embodiment, the insulating layer 44 lies on the conductive layer 54 and the insulating layer 55. The magnetic layer 45 lies on the magnetic layers 51 and 52 and the insulating layer 44.

The magnetic head further includes a non-illustrated connection layer of columnar shape that penetrates a plurality of layers interposed between the conductive layer 20 and the conductive layer 54. The lead 114 is connected via the non-illustrated connection layer to a portion of the conductive layer 20 near its end in the longitudinal direction which constitutes one end of the first coil 111. In the present embodiment, the conductive layer 20 is drawn in the X direction from the space defined by the magnetic layer 17 and the magnetic layer 18, and then extends in the Y direction. The non-illustrated connection layer may include a magnetic portion made of a magnetic conductive material and a nonmagnetic portion made of a nonmagnetic conductive material. Alternatively, the non-illustrated connection layer may consist entirely of the nonmagnetic portion and not include the magnetic portion.

The present embodiment may be provided without the fourth shield portion 124 of the write shield 120 and the fourth yoke portion 144 and the second coupling portion 146 of the return path section 140. More specifically, the present embodiment may be provided without the magnetic layer 17 and the portion 23A of the magnetic layer 23 forming the fourth shield portion 124, the magnetic layer 10 forming the fourth yoke portion 144, and the magnetic layer 18 and the portion 23D of the magnetic layer 23 forming the second coupling portion 146.

The magnetic path passing through the third yoke portion 143 and connecting the write shield 120 and part of the main pole 30 located away from the medium facing surface 50 to each other is longer in the present embodiment than in the first embodiment. The remainder of configuration, function and effects of the present embodiment are similar to those of the first embodiment.

Third Embodiment

Figure 15:
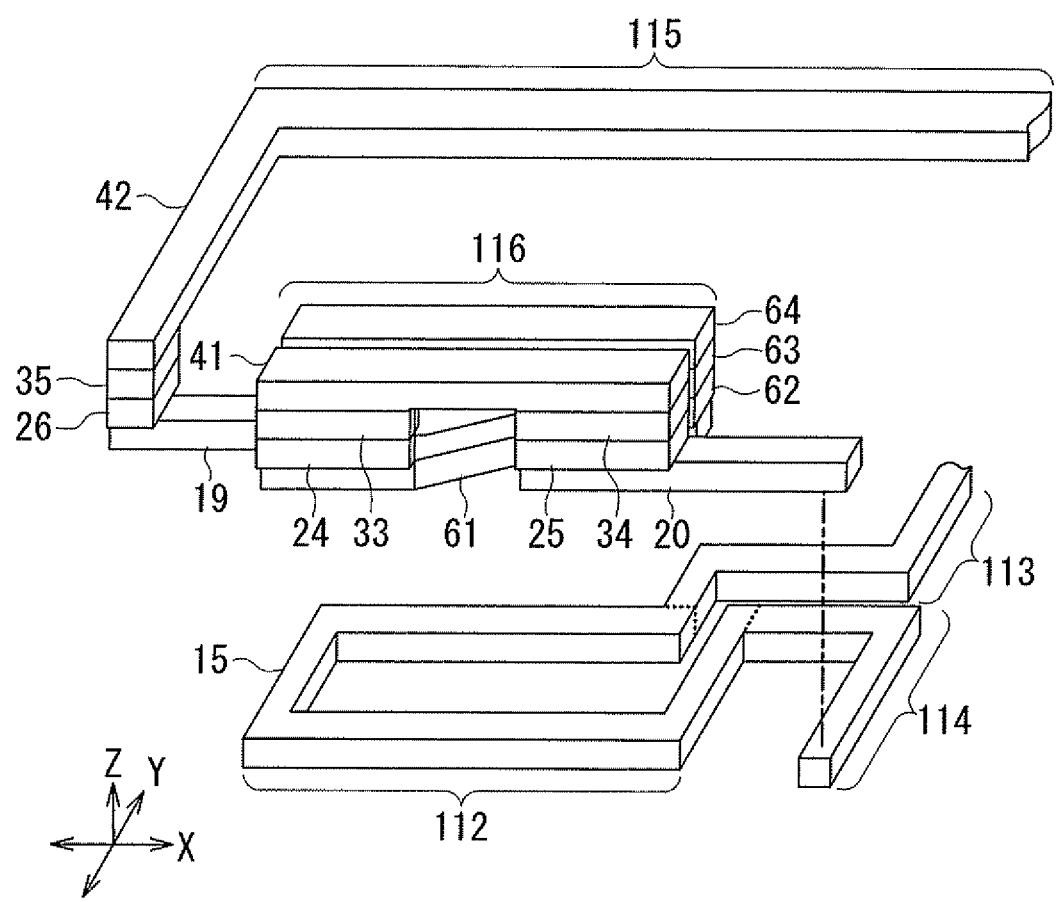
FIG. 15 is a perspective view showing first and second coils of a magnetic head according to a third embodiment of the invention.
Figure 16:
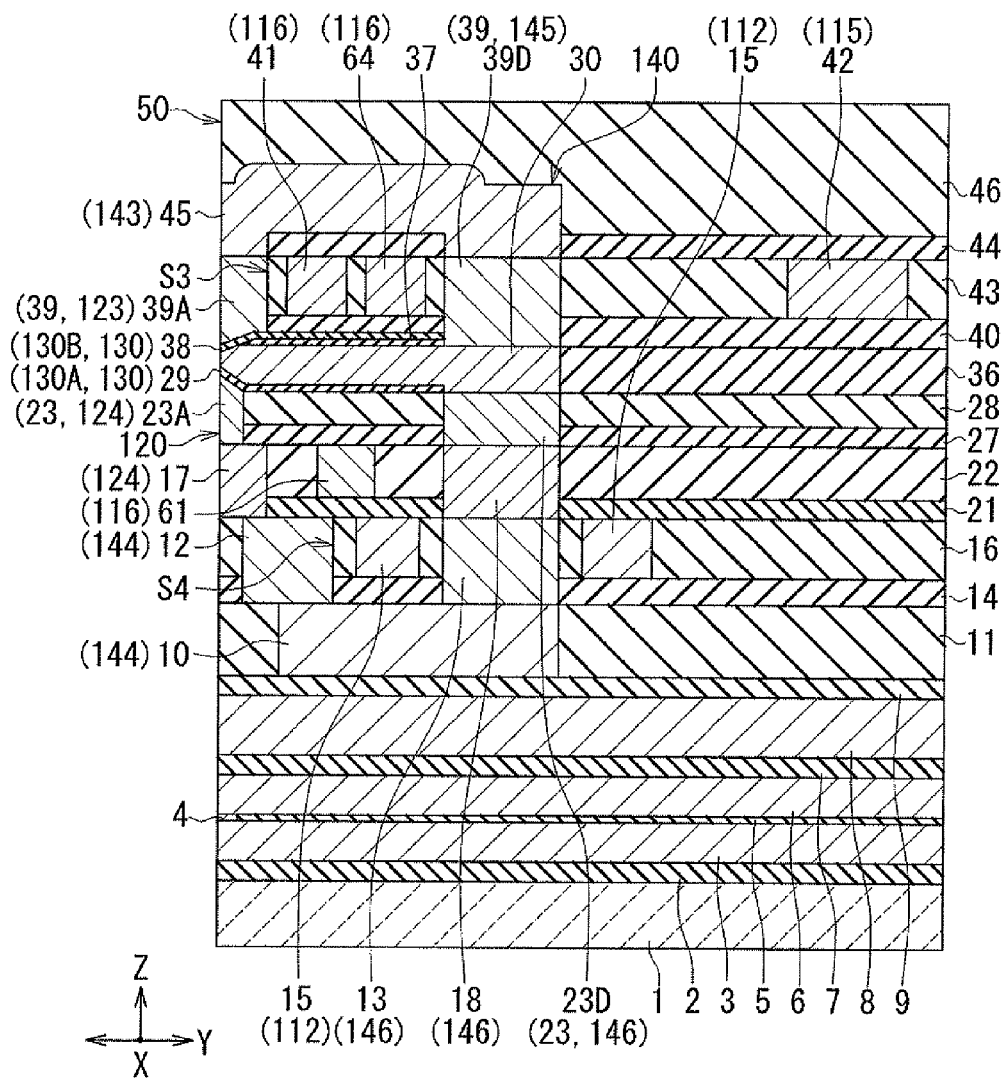
FIG. 16 is a cross-sectional view showing the configuration of the magnetic head according to the third embodiment of the invention.

A third embodiment of the invention will now be described with reference to FIG. 15 and FIG. 16. FIG. 15 is a perspective view showing the first and second coils of the magnetic head according to the present embodiment. FIG. 16 is a cross-sectional view showing the configuration of the magnetic head according to the present embodiment.

The magnetic head according to the present embodiment differs from the magnetic head according to the first embodiment in the following ways. The magnetic head according to the present embodiment has a first coil 116 in place of the first coil 111 of the first embodiment. The first coil 116 passes through the first and second spaces S1 and S2 (see FIG. 3 and FIG. 7) so as to surround the entire outer periphery of the main pole 30 when viewed from the medium facing surface 50, and wraps approximately two turns around the entire outer periphery of the main pole 30.

The first coil 116 passes through the third and fourth spaces S3 and S4 in addition to the first and second spaces S1 and S2. In other words, the first coil 116 includes a portion passing through the third space S3 and a portion passing through the fourth space S4. Both ends of the first coil 116 are located on the rear side in the direction of travel of the recording medium relative to the main pole 30. The lead 114 is connected to one end of the first coil 116. The lead 115 is connected to the other end of the first coil 116.

The first coil 116 may include a magnetic portion made of a magnetic conductive material and a nonmagnetic portion made of a nonmagnetic conductive material. Alternatively, the first coil 116 may consist entirely of the nonmagnetic portion and not include the magnetic portion.

In the present embodiment, the yoke length, i.e., the distance from the medium facing surface 50 to one of edges of the one or more interfaces between the main pole 30 and the return path section 140 that is closest to the medium facing surface 50, is greater than that in the first embodiment. The yoke length in the present embodiment falls within the range of 1.5 to 4.5 μm, for example.

The configuration of the magnetic head according to the present embodiment will now be described in more detail. The magnetic head according to the present embodiment includes conductive layers 61, 62, 63 and 64 and non-illustrated first and second conductive layers, in addition to the conductive layers 15, 19, 20, 24 to 26, 33 to 35, 41 and 42. The first coil 116 is formed of the conductive layers 19, 20, 24, 25, 33, 34, 41 and 61 to 64 and the non-illustrated first and second conductive layers. The locations of the conductive layers 24 and 25 are the same as those in the first embodiment. The conductive layer 62 and the non-illustrated first conductive layer are present in the space defined by the portions 23A to 23D (see FIG. 6) of the magnetic layer 23 and are located farther from the medium facing surface 50 than are the conductive layers 24 and 25, being aligned in the track width direction (the X direction) and spaced from each other. The insulating layers 27 and 28 are disposed around the conductive layer 62 and the non-illustrated first conductive layer.

The locations of the conductive layers 33 and 34 are the same as those in the first embodiment. The conductive layer 63 lies on the conductive layer 62. The non-illustrated second conductive layer lies on the non-illustrated first conductive layer. The conductive layer 63 and the non-illustrated second conductive layer are located farther from the medium facing surface 50 than are the conductive layers 33 and 34, lying on opposite sides of the main pole 30 in the track width direction and being spaced from the main pole 30.

The location of the conductive layer 20 is the same as that in the first embodiment. The conductive layer 19 is located farther from the medium facing surface 50 than it is in the first embodiment. The conductive layer 61 is shaped to be long and narrow, and lies on the insulating layer 21. The conductive layer 61 includes a first portion that is located farther from the medium facing surface 50 than is the conductive layer 20, a second portion that is located closer to the medium facing surface 50 than is the conductive layer 19, and a third portion coupling the first portion and the second portion to each other. The third portion passes between the conductive layer 19 and the conductive layer 20. The insulating layers 22 and 27 are disposed around the conductive layer 61.

The location of the conductive layer 41 is the same as that in the first embodiment. The conductive layer 64 is present in the space defined by the portions 39A to 39D (see FIG. 8) of the magnetic layer 39, being located farther from the medium facing surface 50 than is the conductive layer 41 and lying on the conductive layer 63, the non-illustrated second conductive layer and the insulating layer 40. In the present embodiment, the insulating layer 40 has two openings for exposing the top surfaces of the conductive layer 63 and the non-illustrated second conductive layer, in addition to the three openings for exposing the top surfaces of the conductive layers 33 to 35. The conductive layer 64 extends in the X direction. Portions of the conductive layer 64 near its opposite ends in the longitudinal direction are in contact with the conductive layer 63 and the non-illustrated second conductive layer, respectively. The insulating layers 43 and 44 are disposed around the conductive layer 64.

The conductive layers 19, 20, 41, 61 and 64 are formed of a nonmagnetic conductive material. The conductive layers 24, 25, 33, 34, 62 and 63 and the non-illustrated first and second conductive layers may be formed of a magnetic conductive material or a nonmagnetic conductive material. If these conductive layers are formed of a magnetic conductive material, they correspond to the magnetic portion of the first coil 116. In this case, the magnetic layers 23, 31 and 32, which form part of each of the write shield 120 and the return path section 140, may be formed of the same material as the aforementioned conductive layers. If the aforementioned conductive layers are formed of a nonmagnetic conductive material, they correspond to the nonmagnetic portion of the first coil 116.

In the present embodiment, the number of turns of the first coil 116 is approximately two, being greater than the number of turns of the first coil 111 of the first embodiment. The present embodiment thus makes it possible to increase the magnetomotive force produced by the first coil 116 to allow the main pole 30 to produce a write magnetic field of greater magnitude.

As in the second embodiment, the second coil 112 and the leads 113 and 114 may be located on the front side in the direction of travel of the recording medium (the Z direction) relative to the main pole 30. The remainder of configuration, function and effects of the present embodiment are similar to those of the first or second embodiment.

Fourth Embodiment

Figure 17:
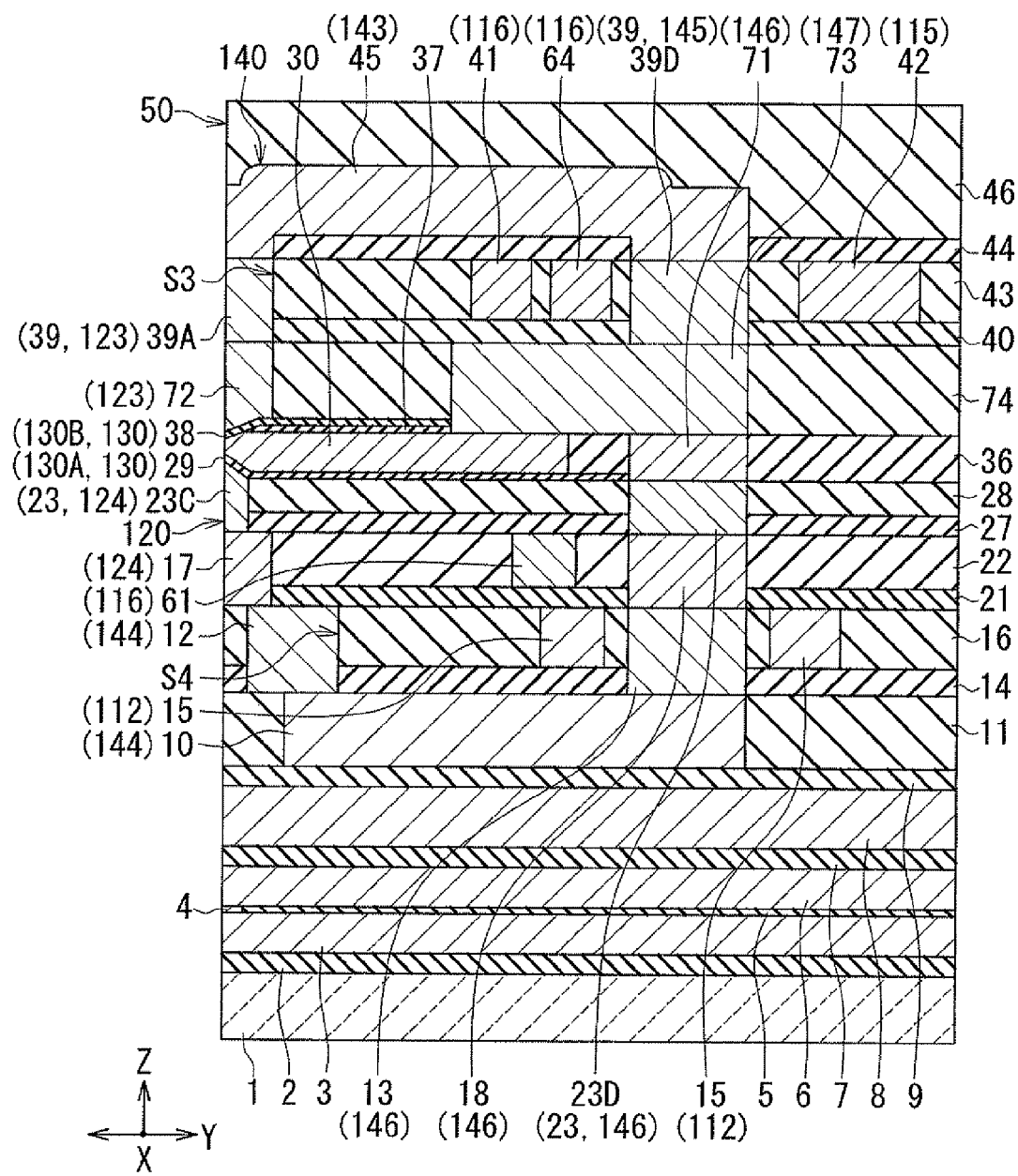
FIG. 17 is a cross-sectional view showing the configuration of a magnetic head according to a fourth embodiment of the invention.

A fourth embodiment of the invention will now be described with reference to FIG. 17. FIG. 17 is a cross-sectional view showing the configuration of the magnetic head according to the present embodiment. The magnetic head according to the present embodiment differs from the magnetic head according to the third embodiment in the following ways. In the magnetic head according to the present embodiment, the return path section 140 includes an auxiliary yoke 147 in addition to the first to fourth yoke portions 141 to 144 and the first and second coupling portions 145 and 146. The auxiliary yoke 147 is located away from the medium facing surface 50 and lies on the top surface of the main pole 30. In the present embodiment, the first and second coupling portions 145 and 146 are both connected to the auxiliary yoke 147 and magnetically connected via the auxiliary yoke 147 to part of the main pole 30 located away from the medium facing surface 50.

In the present embodiment, the first coil 116 are wound around both the main pole 30 and the auxiliary yoke 147. Specifically, the first coil 116 passes through the first and second spaces S1 and S2 (see FIG. 3 and FIG. 7) so as to surround the entire outer periphery of each of the main pole 30 and the auxiliary yoke 147 when viewed from the medium facing surface 50, and wraps approximately two turns around the entire outer periphery of each of the main pole 30 and the auxiliary yoke 147.

The configuration of the magnetic head according to the present embodiment will now be described in more detail. In the present embodiment, the magnetic layers 13 and 18 and the portion 23D of the magnetic layer 23 are located farther from the medium facing surface 50 than they are in the first embodiment. The magnetic head according to the present embodiment includes a magnetic layer 71 made of a magnetic material. The magnetic layer 71 is located farther from the medium facing surface 50 than is the main pole 30 and lies on the portion 23D of the magnetic layer 23. The nonmagnetic layer 29 and the insulating layer 36 are disposed around the magnetic layer 71. In the present embodiment, the second coupling portion 146 is formed of the magnetic layers 13, 18 and 71 and the portion 23D of the magnetic layer 23.

The magnetic head further includes magnetic layers 72 and 73 each made of a magnetic material. The magnetic layer 72 has an end face located in the medium facing surface 50 and lies on the main pole 30, the magnetic layers 31 and 32 (see FIG. 3 and FIG. 7) and the nonmagnetic layer 38. The magnetic layer 72 extends in the X direction, for example. The magnetic layer 73 is located farther from the medium facing surface 50 than is the magnetic layer 72 and lies on the main pole 30, the magnetic layer 71 and the insulating layer 36. The magnetic layer 73 extends in the Y direction, for example. The portion 39A of the magnetic layer 39 lies on the magnetic layer 72. The portion 39D of the magnetic layer 39 lies-on the magnetic layer 73. In the present embodiment, the third shield portion 123 of the write shield 120 is formed of the portion 39A of the magnetic layer 39 and the magnetic layer 72. The auxiliary yoke 147 is formed of the magnetic layer 73.

The magnetic head further includes non-illustrated third to sixth conductive layers. In the present embodiment, the first coil 116 is formed of the conductive layers 19, 20, 24, 25, 33, 34, 41 and 61 to 64 and the non-illustrated first to sixth conductive layers. The non-illustrated third conductive layer lies on the conductive layer 33. The non-illustrated fourth conductive layer lies on the conductive layer 34. The non-illustrated fifth conductive layer lies on the non-illustrated second conductive layer described in the third embodiment section. The non-illustrated sixth conductive layer lies on the conductive layer 63. The non-illustrated third and fourth conductive layers are located on opposite sides of the magnetic layer 73 (the auxiliary yoke 147) in the track width direction, and are spaced from the magnetic layer 73. The non-illustrated fifth and sixth conductive layers are located farther from the medium facing surface 50 than are the non-illustrated third and fourth conductive layers, being on opposite sides of the magnetic layer 73 in the track width direction and spaced from the magnetic layer 73.

The non-illustrated third to sixth conductive layers may be formed of a magnetic conductive material or a nonmagnetic conductive material. If the non-illustrated third to sixth conductive layers are formed of a magnetic conductive material, they correspond to the magnetic portion of the first coil 116. In this case, the magnetic layers 72 and 73, which form part of each of the write shield 120 and the return path section 140, may be formed of the same material as the non-illustrated third to sixth conductive layers. If the non-illustrated third to sixth conductive layers are formed of a nonmagnetic conductive material, they correspond to the nonmagnetic portion of the first coil 116.

The magnetic head further includes an insulating layer 74 disposed around the magnetic layers 72 and 73 and the non-illustrated third to sixth conductive layers. The insulating layer 74 is made of alumina, for example.

In the present embodiment, the insulating layer 40 lies on the magnetic layer 73 and the insulating layer 74 and surrounds the magnetic layer 39. The conductive layer 41 is present in the space defined by the portions 39A to 39D (see FIG. 8) of the magnetic layer 39 and lies on the non-illustrated third and fourth conductive layers and the insulating layer 40. The conductive layer 64 is present in the space defined by the portions 39A to 39D of the magnetic layer 39, being located farther from the medium facing surface 50 than is the conductive layer 41 and lying on the non-illustrated fifth and sixth conductive layers and the insulating layer 40. The insulating layer 40 has four openings for exposing the top surfaces of the non-illustrated third to sixth conductive layers. Portions of the conductive layer 41 near its opposite ends in the longitudinal direction are in contact with the non-illustrated third and fourth conductive layers, respectively. Portions of the conductive layer 64 near its opposite ends in the longitudinal direction are in contact with the non-illustrated fifth and sixth conductive layers, respectively.

The effects of the present embodiment will now be described in comparison with the magnetic head according to the third embodiment. In the magnetic head according to the third embodiment, too great a magnetomotive force generated by the first coil 116 will cause saturation of magnetic flux in a part of the main pole 30 located away from the medium facing surface 50. This will result in problems such as a reduction in the amount of magnetic flux in the vicinity of the end face of the main pole 30, deterioration in write characteristics such as overwrite property, and an increase in error rate. To address this, in the present embodiment the first coil 116 is wound around both the main pole 30 and the auxiliary yoke 147. The present embodiment thus increases the volume of the magnetic material for the first coil 116 to be wound around, thereby preventing saturation of magnetic flux in the part of the main pole 30 located away from the medium facing surface 50.

The remainder of configuration, function and effects of the present embodiment are similar to those of the third embodiment.

The present invention is not limited to the foregoing embodiments, and various modifications may be made thereto. For example, the magnetic head of the present invention may be a thermally-assisted magnetic recording head or a microwave-assisted magnetic recording head provided with a means for applying heat or a microwave magnetic field to a recording medium.

Further, in the magnetic head of the present invention, the first coil 111 may be replaced with a coil that does not wrap one turn around the entire outer periphery of the main pole 30 but surrounds a portion of the entire outer periphery of the main pole 30 that is located on the rear side in the direction of travel of the recording medium (the Z direction) and portions thereof located on opposite sides in the track width direction (the X direction). Such a coil passes through the fourth space S4 in addition to the first and second spaces S1 and S2. In other words, the coil includes a portion passing through the fourth space S4.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
    a medium facing surface facing a recording medium;
    a first coil and a second coil producing magnetic fields corresponding to data to be written on the recording medium;
    a main pole having an end face located in the medium facing surface, the main pole allowing magnetic fluxes that correspond to the magnetic fields produced by the first and second coils to pass, and producing a write magnetic field for writing the data on the recording medium by means of a perpendicular magnetic recording system;
    a write shield made of a magnetic material and having an end face located in the medium facing surface;
    a gap part made of a nonmagnetic material and interposed between the main pole and the write shield;
    a return path section made of a magnetic material, the return path section connecting the write shield and a part of the main pole located away from the medium facing surface to each other; and
    a core part made of a magnetic material and magnetically connected to the part of the main pole located away from the medium facing surface, wherein
    the end face of the write shield includes a first end face portion and a second end face portion located on opposite sides of the end face of the main pole in a track width direction,
    the write shield includes a first shield portion and a second shield portion located on opposite sides of the main pole in the track width direction,
    the first shield portion has the first end face portion,
    the second shield portion has the second end face portion,
    the return path section includes a first yoke portion and a second yoke portion located on opposite sides of the main pole in the track width direction,
    the first yoke portion is connected to the first shield portion so that a first space is defined by the main pole, the gap part, the first shield portion and the first yoke portion,
    the second yoke portion is connected to the second shield portion so that a second space is defined by the main pole, the gap part, the second shield portion and the second yoke portion,
    the first coil passes through the first and second spaces so as to surround at least part of an entire outer periphery of the main pole when viewed from the medium facing surface,
    the first shield portion includes a portion located between the first space and the medium facing surface,
    the second shield portion includes a portion located between the second space and the medium facing surface, and
    the second coil passes through neither of the first and second spaces and surrounds at least part of the core part.

2. The magnetic head according to claim 1, wherein
    the end face of the write shield further includes a third end face portion located on a front side in a direction of travel of the recording medium relative to the end face of the main pole,
    the write shield further includes a third shield portion located on the front side in the direction of travel of the recording medium relative to the main pole, and
    the third shield portion has the third end face portion.

3. The magnetic head according to claim 2, wherein
    the return path section further includes a third yoke portion located on the front side in the direction of travel of the recording medium relative to the main pole, and
    the third yoke portion is connected to the third shield portion so that a third space is defined by the main pole, the gap part, the third shield portion and the third yoke portion.

4. The magnetic head according to claim 3, wherein the first coil includes a portion passing through the third space.

5. The magnetic head according to claim 1, wherein
    the end face of the write shield further includes a fourth end face portion located on a rear side in a direction of travel of the recording medium relative to the end face of the main pole,
    the write shield further includes a fourth shield portion located on the rear side in the direction of travel of the recording medium relative to the main pole, and
    the fourth shield portion has the fourth end face portion.

6. The magnetic head according to claim 5, wherein
    the return path section further includes a fourth yoke portion located on the rear side in the direction of travel of the recording medium relative to the main pole, and
    the fourth yoke portion is connected to the fourth shield portion so that a fourth space is defined by the main pole, the gap part, the fourth shield portion and the fourth yoke portion.

7. The magnetic head according to claim 6, wherein the first coil includes a portion passing through the fourth space.

8. The magnetic head according to claim 1, wherein
    the end face of the write shield further includes a third end face portion located on a front side in a direction of travel of the recording medium relative to the end face of the main pole, and a fourth end face portion located on a rear side in the direction of travel of the recording medium relative to the end face of the main pole, the write shield further includes a third shield portion located on the front side in the direction of travel of the recording medium relative to the main pole, and a fourth shield portion located on the rear side in the direction of travel of the recording medium relative to the main pole, the third shield portion has the third end face portion, and the fourth shield portion has the fourth end face portion.

9. The magnetic head according to claim 8, wherein the return path section further includes a third yoke portion located on the front side in the direction of travel of the recording medium relative to the main pole, and a fourth yoke portion located on the rear side in the direction of travel of the recording medium relative to the main pole, the third yoke portion is connected to the third shield portion so that a third space is defined by the main pole, the gap part, the third shield portion and the third yoke portion, and the fourth yoke portion is connected to the fourth shield portion so that a fourth space is defined by the main pole, the gap part, the fourth shield portion and the fourth yoke portion.

10. The magnetic head according to claim 9, wherein the first coil includes a portion passing through at least one of the third space and the fourth space.

11. The magnetic head according to claim 1, wherein the second coil is located on a front side in a direction of travel of the recording medium relative to the main pole.

12. The magnetic head according to claim 11, wherein the end face of the write shield further includes a third end face portion located on the front side in the direction of travel of the recording medium relative to the end face of the main pole, the write shield further includes a third shield portion located on the front side in the direction of travel of the recording medium relative to the main pole, the third shield portion has the third end face portion, the return path section further includes a third yoke portion located on the front side in the direction of travel of the recording medium relative to the main pole, and the third yoke portion couples the third shield portion and the core part to each other so that a third space is defined by the main pole, the gap part, the third shield portion, the third yoke portion and the core part.

13. The magnetic head according to claim 1, wherein the second coil is located on a rear side in a direction of travel of the recording medium relative to the main pole.

14. The magnetic head according to claim 13, wherein the end face of the write shield further includes a fourth end face portion located on the rear side in the direction of travel of the recording medium relative to the end face of the main pole, the write shield further includes a fourth shield portion located on the rear side in the direction of travel of the recording medium relative to the main pole, the fourth shield portion has the fourth end face portion, the return path section further includes a fourth yoke portion located on the rear side in the direction of travel of the recording medium relative to the main pole, and the fourth yoke portion couples the fourth shield portion and the core part to each other so that a fourth space is defined by the main pole, the gap part, the fourth shield portion, the fourth yoke portion and the core part.

15. The magnetic head according to claim 1, wherein the end face of the write shield further includes a third end face portion located on a front side in a direction of travel of the recording medium relative to the end face of the main pole, and a fourth end face portion located on a rear side in the direction of travel of the recording medium relative to the end face of the main pole, the write shield further includes a third shield portion located on the front side in the direction of travel of the recording medium relative to the main pole, and a fourth shield portion located on the rear side in the direction of travel of the recording medium relative to the main pole, the third shield portion has the third end face portion, the fourth shield portion has the fourth end face portion, the return path section further includes a third yoke portion located on the front side in the direction of travel of the recording medium relative to the main pole, and a fourth yoke portion located on the rear side in the direction of travel of the recording medium relative to the main pole, the third yoke portion is connected to the third shield portion so that a third space is defined by the main pole, the gap part, the third shield portion and the third yoke portion, the fourth yoke portion couples the fourth shield portion and the core part to each other so that a fourth space is defined by the main pole, the gap part, the fourth shield portion, the fourth yoke portion and the core part, the first coil includes a portion passing through the third space, and the second coil includes a portion passing through the fourth space.

16. The magnetic head according to claim 1, wherein the first coil does not wrap one turn around the entire outer periphery of the main pole.

17. The magnetic head according to claim 1, wherein the first coil surrounds the entire outer periphery of the main pole when viewed from the medium facing surface.

18. A head assembly comprising a slider, and a supporter that flexibly supports the slider, wherein the slider includes the magnetic head according to claim 1 and is disposed to face a recording medium.

19. A magnetic recording device comprising the magnetic head according to claim 1, a recording medium, and a positioning device that supports the magnetic head and positions the magnetic head with respect to the recording medium.

* * * * *